(12) United States Patent
McKee et al.

(10) Patent No.: US 12,480,662 B2
(45) Date of Patent: Nov. 25, 2025

(54) MODULAR COOKING APPLIANCE HAVING A USER INTERFACE

(71) Applicant: Automation Tech, LLC, Elgin, IL (US)

(72) Inventors: Philip R. McKee, Dallas, TX (US); James K. Pool, III, Frisco, TX (US)

(73) Assignee: Automation Tech, LLC, Elgin, IL (US)

( * ) Notice: Subject to any disclaimer, the term of this patent is extended or adjusted under 35 U.S.C. 154(b) by 1090 days.

(21) Appl. No.: 17/211,407

(22) Filed: Mar. 24, 2021

(65) Prior Publication Data

US 2021/0310662 A1    Oct. 7, 2021

Related U.S. Application Data

(63) Continuation-in-part of application No. 17/094,438, filed on Nov. 10, 2020, now Pat. No. 12,178,357.
(Continued)

(51) Int. Cl.
*F24C 7/08*   (2006.01)
*F24C 15/16*  (2006.01)
*F24C 15/32*  (2006.01)

(52) U.S. Cl.
CPC ............. *F24C 7/086* (2013.01); *F24C 7/085* (2013.01); *F24C 15/16* (2013.01); *F24C 15/325* (2013.01)

(58) Field of Classification Search
CPC .......... F24C 7/086; F24C 7/085; F24C 15/16; F24C 15/162; F24C 15/325; H05B 6/80; A21B 1/245; A21B 3/07
See application file for complete search history.

(56) References Cited

U.S. PATENT DOCUMENTS 2,104,024 A   1/1938   Conbole
2,742,557 A   4/1956   Macoicz
(Continued)

FOREIGN PATENT DOCUMENTS

CA   2644980 C   5/2014
CN   2784779 Y   5/2006
(Continued)

OTHER PUBLICATIONS

United States Patent and Trademark Office, Office Action for U.S. Appl. No. 16/997,402, Mail Date of Dec. 8, 2021. 11 pp., United States.
(Continued)

*Primary Examiner* — Edward F Landrum
*Assistant Examiner* — Kuangyue Chen
(74) *Attorney, Agent, or Firm* — Amster, Rothstein & Ebenstein LLP

(57) ABSTRACT

A modular cooking apparatus includes a housing having a first interchangeable cooking module, a second interchangeable cooking module, and a single power connection for receiving electrical power from a wall outlet. The first interchangeable cooking module contains a first oven, and the second interchangeable cooking module contains a second oven. The second oven is a different oven type from the first oven. The modular cooking apparatus also includes a controller within the housing for controlling the first and second ovens. The controller includes a memory for storing a list of food items to be cooked within the modular cooking apparatus and a corresponding oven type for each of the food items. The modular cooking apparatus further includes a control panel on the housing which displays a user interface that directs an operator of the modular cooking apparatus to the oven that should be used to cook a particular food item.

27 Claims, 21 Drawing Sheets

Related U.S. Application Data which is a continuation-in-part of application No. 16/838,540, filed on Apr. 2, 2020, now Pat. No. 12,239,255.

(56) References Cited

U.S. PATENT DOCUMENTS

| | | |
|---|---|---|
| 3,028,472 A | 4/1962 | Baird |
| 3,320,396 A | 5/1967 | Helmut |
| 3,557,333 A | 1/1971 | McAvoy |
| 3,619,536 A | 11/1971 | Boehm |
| 3,827,346 A | 8/1974 | Tropp et al. |
| 3,884,213 A | 5/1975 | Smith |
| 4,154,861 A | 5/1979 | Smith |
| 4,180,049 A | 12/1979 | Carr et al. |
| 4,246,462 A | 1/1981 | Meisel |
| 4,455,478 A | 6/1984 | Guibert |
| 4,566,804 A | 1/1986 | Collins et al. |
| 4,949,629 A | 8/1990 | Leary et al. |
| 4,972,824 A | 11/1990 | Luebke et al. |
| 5,025,775 A | 6/1991 | Crisp |
| 5,039,535 A | 8/1991 | Lang et al. |
| 5,172,682 A | 12/1992 | Luebke et al. |
| 5,223,008 A | 6/1993 | Troxell |
| 5,277,105 A | 1/1994 | Bruno et al. |
| 5,421,316 A | 6/1995 | Heber |
| 5,878,738 A | 3/1999 | Poirier |
| 5,906,485 A | 5/1999 | Groff et al. |
| 5,994,683 A | 11/1999 | Braunisch et al. |
| 6,518,553 B1 | 2/2003 | Leykin et al. |
| 6,572,911 B1 | 6/2003 | Corcoran et al. |
| 6,691,698 B2 | 2/2004 | Gunawardena et al. |
| 6,712,064 B2 | 3/2004 | Stacy et al. |
| 7,053,349 B2 | 5/2006 | Jeong |
| 7,087,872 B1 | 8/2006 | Dobie et al. |
| 7,220,944 B2 | 5/2007 | Miller |
| 7,592,570 B2 | 9/2009 | Yoder et al. |
| 8,093,538 B2 | 1/2012 | Claesson et al. |
| 8,319,160 B2 | 11/2012 | Koschberg et al. |
| 8,384,000 B2 | 2/2013 | Ruffing et al. |
| 8,578,585 B2 | 11/2013 | Dettloff |
| 9,163,877 B2 | 10/2015 | Lopez et al. |
| 9,288,997 B2 | 3/2016 | McKee |
| 9,516,704 B2 | 12/2016 | Stanger |
| 9,775,358 B2 | 10/2017 | McKee |
| 9,857,082 B2 | 1/2018 | McKee |
| 9,879,865 B2 | 1/2018 | McKee et al. |
| 10,140,587 B2 | 11/2018 | Garden |
| 10,184,722 B1 | 1/2019 | Ingle |
| 10,492,641 B2 | 12/2019 | Kestner et al. |
| 10,684,022 B2 | 6/2020 | McKee et al. |
| 10,729,144 B2 | 8/2020 | McKee et al. |
| 10,765,119 B2 | 9/2020 | Johnson et al. |
| 11,011,909 B1 | 5/2021 | Gurin |
| 2002/0003140 A1 | 1/2002 | Day et al. |
| 2003/0056658 A1 | 3/2003 | Jones et al. |
| 2004/0262286 A1 | 12/2004 | Henke et al. |
| 2005/0193901 A1 | 9/2005 | Buehler |
| 2005/0224064 A1 | 10/2005 | Stockley |
| 2005/0255208 A1 | 11/2005 | Shei |
| 2006/0007059 A1 | 1/2006 | Bell |
| 2006/0163238 A1 | 7/2006 | Miller et al. |
| 2006/0266349 A1 | 11/2006 | Beck et al. |
| 2007/0246451 A1 | 10/2007 | Willett |
| 2008/0083729 A1 | 4/2008 | Etheredge et al. |
| 2008/0092754 A1 | 4/2008 | Noman |
| 2008/0105136 A1 | 5/2008 | McFadden |
| 2008/0283035 A1 | 11/2008 | McKee et al. |
| 2009/0194090 A1 | 8/2009 | Kim et al. |
| 2009/0236331 A1 | 9/2009 | McKee et al. |
| 2010/0071565 A1 | 3/2010 | Backus et al. |
| 2010/0247721 A1 | 9/2010 | McGhee, Jr. et al. |
| 2010/0276413 A1 | 11/2010 | Nam et al. |
| 2011/0083657 A1 | 4/2011 | Ploof et al. |
| 2011/0114634 A1 | 5/2011 | Nevarez |
| 2011/0120990 A1 | 5/2011 | Heimerdinger |
| 2011/0139140 A1 | 6/2011 | Baker et al. |
| 2011/0241503 A1 | 10/2011 | Simon |
| 2012/0111857 A1 | 5/2012 | McKee et al. |
| 2012/0308702 A1 | 12/2012 | Khatchadourian et al. |
| 2013/0008893 A1 | 1/2013 | Little et al. |
| 2013/0156906 A1 | 6/2013 | Raghavan et al. |
| 2013/0177683 A1 | 7/2013 | Shei et al. |
| 2013/0202761 A1 | 8/2013 | McKee |
| 2013/0213951 A1 | 8/2013 | Boedicker et al. |
| 2014/0326710 A1 | 11/2014 | McKee et al. |
| 2014/0370167 A1 | 12/2014 | Garden |
| 2015/0017305 A1 | 1/2015 | Olver et al. |
| 2015/0096974 A1 | 4/2015 | Freeman et al. |
| 2015/0181655 A1 | 6/2015 | McKee et al. |
| 2015/0241069 A1 | 8/2015 | Brant et al. |
| 2015/0327726 A1 | 11/2015 | Betzold et al. |
| 2016/0025350 A1 | 1/2016 | Goble et al. |
| 2016/0068689 A1 | 3/2016 | Lang |
| 2016/0215989 A1 | 7/2016 | Buller-Colthurst |
| 2016/0258634 A1 | 9/2016 | Helm et al. |
| 2016/0296012 A1 | 10/2016 | Ciccacci et al. |
| 2016/0330978 A1 | 11/2016 | Schjerven et al. |
| 2017/0071411 A1 | 3/2017 | Veltrop et al. |
| 2017/0095105 A1 | 4/2017 | Clark et al. |
| 2017/0095106 A1 | 4/2017 | Cook |
| 2017/0156347 A1 | 6/2017 | Reese et al. |
| 2017/0290345 A1 | 10/2017 | Garden et al. |
| 2017/0318629 A1 | 11/2017 | Mohseni |
| 2018/0004276 A1 | 1/2018 | Wong et al. |
| 2018/0103803 A1 | 4/2018 | Laub et al. |
| 2018/0152991 A1 | 5/2018 | Hall et al. |
| 2018/0235396 A1 | 8/2018 | Schönenberger |
| 2019/0050804 A1 | 2/2019 | Garden |
| 2019/0056118 A1 | 2/2019 | McKee et al. |
| 2019/0098921 A1 | 4/2019 | Park et al. |
| 2019/0117019 A1 | 4/2019 | Minard |
| 2019/0141798 A1 | 5/2019 | Cheng et al. |
| 2019/0166850 A1 | 6/2019 | Bailie |
| 2019/0223474 A1 | 7/2019 | Lee |
| 2019/0234617 A1 | 8/2019 | Bhogal et al. |
| 2019/0239517 A1 | 8/2019 | McKee et al. |
| 2019/0239518 A1 | 8/2019 | McKee et al. |
| 2019/0242587 A1 | 8/2019 | McKee et al. |
| 2019/0315224 A1 | 10/2019 | Mitidieri et al. |
| 2020/0018489 A1 | 1/2020 | Lee et al. |
| 2020/0037816 A1 | 2/2020 | Hackley |
| 2020/0064056 A1 | 2/2020 | Hall et al. |
| 2020/0090226 A1 | 3/2020 | Garden et al. |
| 2020/0187510 A1 | 6/2020 | Wolfe et al. |
| 2020/0200393 A1* | 6/2020 | Goldberg ............... F24C 7/088 |
| 2021/0161151 A1 | 6/2021 | Thorogood et al. |
| 2021/0307335 A1 | 10/2021 | McKee et al. |
| 2021/0307336 A1 | 10/2021 | McKee et al. |
| 2021/0307560 A1 | 10/2021 | McKee et al. |
| 2021/0310660 A1 | 10/2021 | McKee et al. |
| 2021/0310662 A1 | 10/2021 | McKee et al. |

FOREIGN PATENT DOCUMENTS

| | | |
|---|---|---|
| CN | 101277558 A | 10/2008 |
| CN | 101287376 A | 10/2008 |
| CN | 101933528 A | 1/2011 |
| CN | 101953645 A | 1/2011 |
| CN | 102401562 A | 4/2012 |
| CN | 202209709 U | 5/2012 |
| CN | 103156532 A | 6/2013 |
| CN | 104272865 A | 1/2015 |
| CN | 107461772 A | 12/2017 |
| CN | 107920688 A | 4/2018 |
| CN | 108459538 A | 8/2018 |
| CN | 109310097 A | 2/2019 |
| CN | 209047299 U | 7/2019 |
| CN | 209489913 U | 10/2019 |
| DE | 19750488 A1 | 5/1999 |
| DE | 10027072 A1 | 1/2002 |
| EP | 1170550 A1 | 1/2002 |
| EP | 1992879 A1 | 11/2008 |
| EP | 2868979 A1 | 5/2015 |
| EP | 3190857 81 | 4/2020 |

(56) References Cited

FOREIGN PATENT DOCUMENTS

| GB | 120631 A | 11/1918 |
|----|----------|---------|
| JP | 201484919 A2 | 5/2014 |
| KR | 20030000202 A | 1/2003 |
| KR | 20050100243 A | 10/2005 |
| KR | 20160084273 A | 7/2016 |
| TW | 201919478 A | 6/2019 |
| WO | 1984001424 A1 | 4/1984 |
| WO | 1997041392 A2 | 11/1997 |
| WO | 2005096826 A1 | 10/2005 |
| WO | 2006099394 A1 | 9/2006 |
| WO | 2007015215 A2 | 2/2007 |
| WO | 2009088145 A1 | 7/2009 |
| WO | 2015075587 A1 | 5/2015 |
| WO | 2018006182 A1 | 1/2018 |
| WO | 2018112597 A1 | 6/2018 |
| WO | 2019050615 A1 | 3/2019 |
| WO | 2019178419 A1 | 9/2019 |

OTHER PUBLICATIONS

Pacific Gas and Electric, PG&E End-Use Briefing, Ovens in Commercial Food Service Operations, May 1997 (Revised Dec. 10, 1999). pp. 1-9. USA.
International Searching Authority, Notification of Transmittal of the International Search Report and the Written Opinion of the International Searching Authority, or the Declaration, PCT/US21/24607, Date of Mailing—Jun. 24, 2021, 12 pp., United States.
International Searching Authority, Notification of Transmittal of the International Search Report and the Written Opinion of the International Searching Authority, or the Declaration, PCT/US21/24614, Date of Mailing—Jun. 23, 2021, 9 pp., United States.
International Searching Authority, Notification of Transmittal of the International Search Report and the Written Opinion of the International Searching Authority, or the Declaration, PCT/US21/24618, Date of Mailing—Jun. 23, 2021, 10 pp., United States.
International Searching Authority, Notification of Transmittal of the International Search Report and the Written Opinion of the International Searching Authority, or the Declaration, PCT/US21/24630, Date of Mailing—Jul. 9, 2021, 7 pp., United States.
International Searching Authority, Notification of Transmittal of the International Search Report and the Written Opinion of the International Searching Authority, or the Declaration, PCT/US21/24639, Date of Mailing—Jul. 12, 2021, 7 pp., United States.
International Searching Authority, Notification of Transmittal of the International Search Report and the Written Opinion of the International Searching Authority, or the Declaration, PCT/US21/24712, Date of Mailing—Jul. 7, 2021, 10 pp., United States.
International Searching Authority, Notification of Transmittal of the International Search Report and the Written Opinion of the International Searching Authority, or the Declaration, PCT/US21/24714, Date of Mailing—Jun. 28, 2021, 10 pp., United States.
International Searching Authority, Notification of Transmittal of the International Search Report and the Written Opinion of the International Searching Authority, or the Declaration, PCT/US21/24715, Date of Mailing—Jun. 29, 2021, 8 pp., United States.
International Searching Authority, Notification of Transmittal of the International Search Report and the Written Opinion of the International Searching Authority, or the Declaration, PCT/US2021/025339, Date of Mailing—Jul. 12, 2021, 11 pp., United States.
Zhou Shaolei et al., "New Technologies and Equipment for Efficient Coal Preparation", Introduction and p. 213, China University of Mining and Technology Press, 1st edition, Jun. 30, 2008. [5 pages total: Chinese original (2 pages), English translation (3 pages)].
China National Intellectual Property Administration, Office Action issued in Application No. CN202180025708.0, dated Aug. 8, 2024. Beijing, China. [14 pages total: Chinese original (6 pages), English translation (8 pages)].
China National Intellectual Property Administration, Office Action issued in Application No. CN202180025618.1, dated Nov. 6, 2023, 18 pages [Chinese original (9 pages), English translation (9 pages)], Beijing, China.
China National Intellectual Property Administration, Office Action issued in Application No. CN202180025618.1, dated Jan. 5, 2023, 16 pages [Chinese original (6 pages), English translation (10 pages)], Beijing, China.
IP Australia, Examination Report issued in Application No. 2021246440, dated Aug. 31, 2023, 5 pages, Phillip ACT, Australia.
Brazil Instituto Nacional Da Propriedade Industrial, Search Report issued in Patent Application No. 112022019466-8, dated Apr. 12, 2024, 4 pages, Rio de Janeiro, Brazil.
Canadian Intellectual Property Office, Examination Report issued in Application No. 3,172,615, dated Feb. 7, 2024, 3 pages, Gatineau, Quebec, Canada.
European Patent Office, Extended European Search Report and Opinion for EP Application No. 21780173.7, dated May 15, 2024, 28 pages, The Hague, Netherlands.

\* cited by examiner

FOOD ENTRY TABLE

| OVEN MODULE | FOOD TYPE | PRIORITY | COOK STAGE 1 | | | | | COOK STAGE 2 | | | | | COOK STAGE 3 | | | | |
|---|---|---|---|---|---|---|---|---|---|---|---|---|---|---|---|---|---|
| | | | From | To | Temp | Blower | Mag | From | To | Temp | Blower | Mag | From | To | Temp | Blower | Mag |
| impingement | pizza | primary | 0 | 30 | 400 | 50 | | 31 | 50 | 400 | 100 | | 51 | 90 | 425 | 80 | |
| impingement | sandwich | primary | 0 | 20 | 425 | 100 | | 21 | 50 | 400 | 100 | | 51 | 70 | 425 | 60 | |
| convection | biscuits | primary | 0 | 50 | 350 | 100 | | 51 | 100 | 350 | 100 | | 101 | 120 | | | |
| microwave | hot dog | primary | 0 | 50 | | | 100 | 51 | 70 | | | 0 | 71 | 90 | | | 50 |
| convection | pizza | secondary | 0 | 60 | 375 | 80 | 0 | 61 | 90 | 375 | 100 | 0 | 91 | 140 | 375 | 90 | 0 |

Figure 8A

MAXIMUM CURRENT DRAWN TABLE

| OVEN MODULE | FOOD TYPE | COOK STAGE 1 | COOK STAGE 2 | COOK STAGE 3 |
|---|---|---|---|---|
| impingement | pizza | 32 | 32 | 32 |
| impingement | sandwich | 32 | 32 | 32 |
| convection | biscuits | 28 | 28 | 28 |
| convection | pizza | 28 | 28 | 28 |
| microwave | hot dog | 16 | 0 | 8 |

Figure 8B

CURRENT DRAWN HISTORY TABLE

| OVEN MODULE | FOOD TYPE | Time Unit 1 | Time Unit 2 | Time Unit 3 | Time Unit 4 | Time Unit 5 | Time Unit 6 | Time Unit 7 | Time Unit 8 |
|---|---|---|---|---|---|---|---|---|---|
| impingement | pizza | 3.2 | 5.6 | 5.6 | 5.6 | 5.6 | 5.6 | 2.8 | 2.8 |
| impingement | sandwich | 5.6 | 5.6 | 5.6 | 5.6 | 5.6 | 5.6 | | |
| convection | biscuits | 2.8 | 2.8 | 3.2 | 3.2 | 3.2 | 3.2 | 3.2 | 3.2 |

Figure 8C

MODULAR COOKING APPLIANCE HAVING A USER INTERFACE

CROSS-REFERENCE TO RELATED APPLICATIONS

The present application is a continuation-in-part of U.S. patent application Ser. No. 17/094,438, filed on Nov. 10, 2020, and entitled "Modular Cooking Appliance," which is a continuation-in-part of U.S. patent application Ser. No. 16/838,540, filed on Apr. 2, 2020, and entitled "Modular Cooking Appliance," the contents of each of which are incorporated herein by reference in their entirety.

TECHNICAL FIELD

The present invention relates to cooking appliances in general, and in particular to a modular cooking appliance having multiple ovens capable of cooking various food types concurrently.

BACKGROUND

In order to cook and serve a wide variety of food items, such as pizzas, bakery products, breakfast sandwiches, proteins, etc., food-service operators generally have to possess different kinds of ovens at the same store location. Different operating skills are typically required to utilize each of the different kinds of ovens for cooking, and multiple ovens tend to occupy valuable countertop spaces and require multiple electrical power plugs.

The present disclosure provides an improved cooking appliance that can streamline the cooking task of a food-service operator.

SUMMARY OF THE INVENTION

In accordance with one embodiment of the present invention, a modular cooking apparatus includes a housing having a first interchangeable cooking module, a second interchangeable cooking module, and a single power connection for receiving electrical power from a wall outlet. The first interchangeable cooking module contains a first oven, and the second interchangeable cooking module contains a second oven. The second oven is a different oven type from the first oven. The modular cooking apparatus also includes a controller within the housing for controlling the first and second ovens. The controller includes a memory for storing a list of food items to be cooked within the modular cooking apparatus and a corresponding oven type for each of the food items. The modular cooking apparatus further includes a control panel on the housing which displays a user interface that directs an operator of the modular cooking apparatus to the oven that should be used to cook a particular food item.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 8A shows an example of a Food Entry Table within the modular cooking appliance from FIG. 1;

FIG. 8B shows an example of a Maximum Current Drawn Table within the modular cooking appliance from FIG. 1;

FIG. 8C shows an example of a Current Drawn History Table within the modular cooking appliance from FIG. 1.

DETAILED DESCRIPTION OF PREFERRED EMBODIMENTS

I. Configuration of Modular Cooking Appliance

Figure 1:
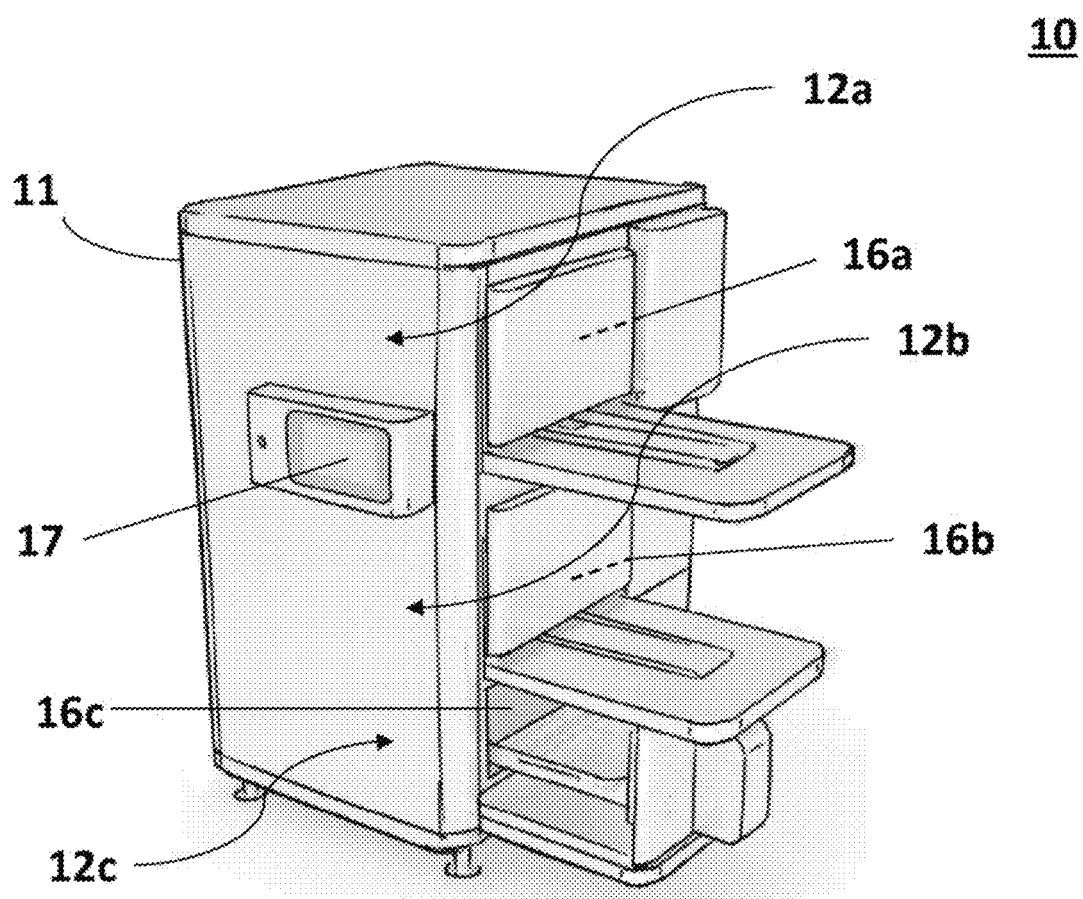
FIG. 1 is an isometric view of a modular cooking appliance, in accordance with one embodiment.

Referring now to the drawings and in particular to FIG. 1, there is depicted an isometric view of a modular cooking appliance, in accordance with one embodiment. As shown, a modular cooking appliance 10 is defined by a housing 11 containing multiple interchangeable cooking modules. For the present embodiment, housing 11 includes interchangeable cooking modules 12a-12c, but it is understood by those skilled in the art that the number of interchangeable cooking modules within housing 11 can be more or less than three. Each of interchangeable cooking modules 12a-12c is for receiving an oven. The ovens contained within interchangeable cooking modules 12a-12c may be identical or different from each other. For the present embodiment, interchangeable cooking module 12a contains an impingement oven that may be used to cook pizzas, interchangeable cooking module 12b contains a convection oven that may be used to cook more delicate yeast-rising food items such as cinnamon rolls, and interchangeable cooking module 12c contains a microwave oven that may be used to cook hot dogs.

Alternatively, interchangeable cooking module 12a may contain a first convection oven, interchangeable cooking module 12b may contain a second convection oven, and interchangeable cooking module 12c may contain an impingement oven. Basically, modular cooking appliance 10 may contain any combination of ovens based on the preferences of food-service operators. Any one of interchangeable cooking modules 12a-12c contained within modular cooking appliance 10, and the ovens located within the interchangeable cooking modules 12a-12c, can be swapped out by field service personnel without disturbing other aspects of modular cooking appliance 10.

For the present embodiment, the heights of interchangeable cooking modules 12a-12c are identical such that the height of housing 11 corresponds to a total number of interchangeable cooking modules installed. Alternatively, the heights of interchangeable cooking modules 12a-12c may vary from each other, depending on the type of oven contained within. For example, a convection oven that cooks yeast-raised products may be taller than an impingement oven that cooks pizzas. Accordingly, the height of housing 11 will correspond to the total height of the ovens contained within.

Interchangeable cooking modules 12a-12c include openings 16a-16c, respectively, to allow food items to be transported into ovens located within interchangeable cooking modules 12a-12c.

Modular cooking appliance 10 includes a common control panel 17 for controlling all the various ovens and food loading mechanisms contained within interchangeable cooking modules 12a-12c. Each of the food loading mechanisms allows food items to be loaded within a cooking chamber of a respective oven. After food items have been placed on a food loading mechanism, an operator can enter operating parameters, such as cooking temperature, cooking time, blower speed, etc., via control panel 17 to effectuate cooking controls on the food items to be cooked, and the food loading mechanism will automatically transport the food items into the oven to begin cooking.

Alternatively, food items can be manually placed within a cooking chamber of an oven by an operator, without using a food loading mechanism or when there is no food loading mechanism attached to an oven.

Control panel 17 is preferably implemented with a touchscreen but it can also be implemented with keypads and liquid crystal display (LCD) that are well-known in the art.

Figure 1A:
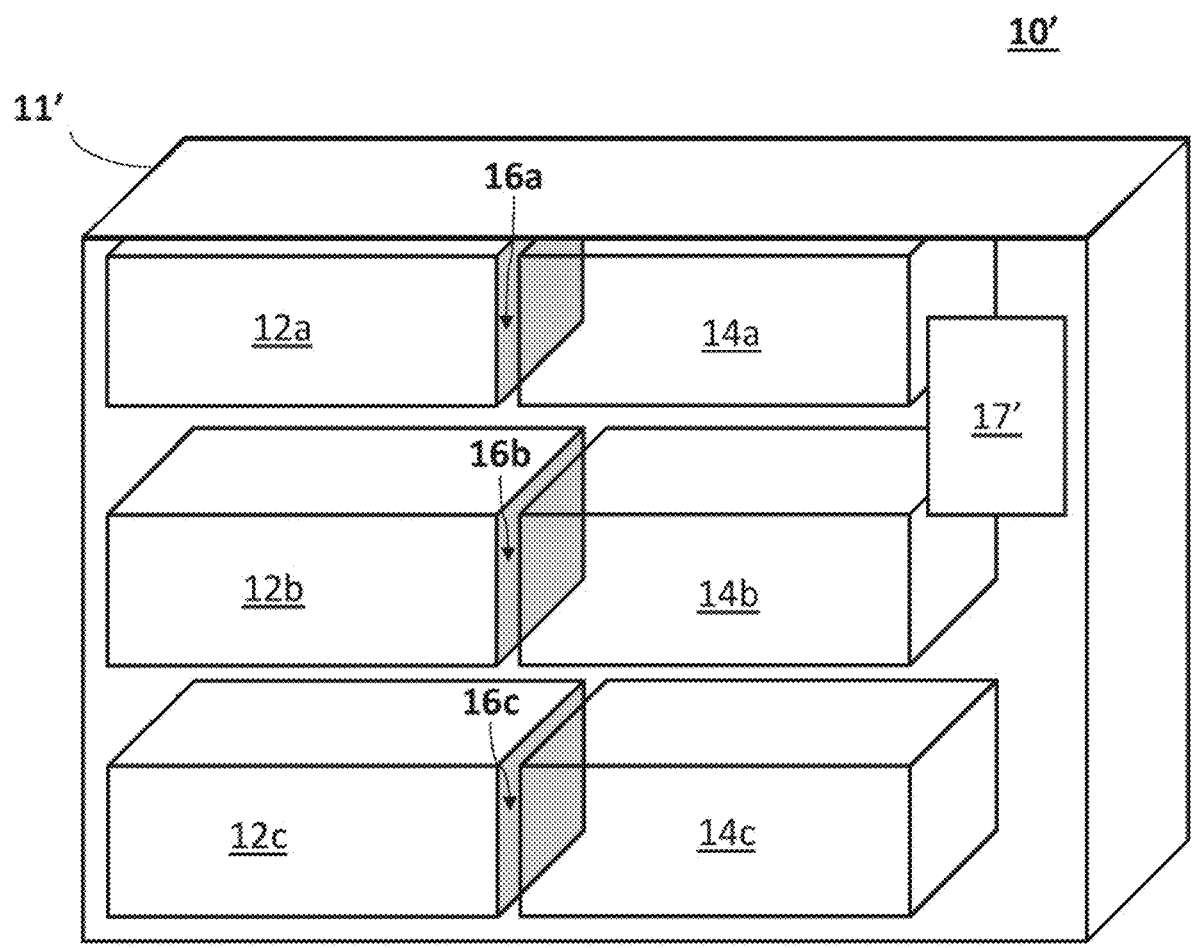
FIG. 1A is an isometric view of the structure of a modular cooking appliance, according to an alternative embodiment.

Referring now to FIG. 1A, there is depicted an isometric view of the structure of modular cooking appliance 10, in accordance with an alternative embodiment. As shown, a modular cooking appliance 10' is defined by a housing 11' containing interchangeable cooking modules 12a-12c. Each of interchangeable cooking modules 12a-12c is for receiving an oven, such as a microwave oven, a convection oven, an impingement oven, a rapid-cook oven, or the like.

Each of interchangeable cooking modules 12a-12c is associated with one of front-facing slots 14a-14c, respectively. Openings 16a-16c allow food items to be transported between ovens located within interchangeable cooking modules 12a-12c and their associated front-facing slots 14a-14c. For example, each of front-facing slots 14a-14c may contain a food loading mechanism for transporting food placed thereon to ovens contained within adjacent interchangeable cooking modules 12a-12c via corresponding openings 16a-16c, respectively. Specifically, food placed on a food loading mechanism contained in front-facing slot 14a will be transported into an oven contained in interchangeable cooking module 12a, food placed on a food loading mechanism contained in front-facing slot 14b will be transported into an oven contained in interchangeable cooking module 12b, and food placed on a food loading mechanism contained in front-facing slot 14c will be transported into an oven contained in interchangeable cooking module 12c. After food has been cooked, the food can be returned by the food loading mechanism back to the front-facing slot from which it entered the associated oven.

Modular cooking appliance 10' includes a common control panel 17' for controlling all the various ovens and food loading mechanisms contained within interchangeable cooking modules 12a-12c and front-facing slots 14a-14c, respectively.

a. Interchangeable Cooking Module

The basic construction of interchangeable cooking modules 12a-12c are substantially identical to each other. Thus, the basic construction of only interchangeable cooking module 12a will be further described in detail.

Figure 1B:
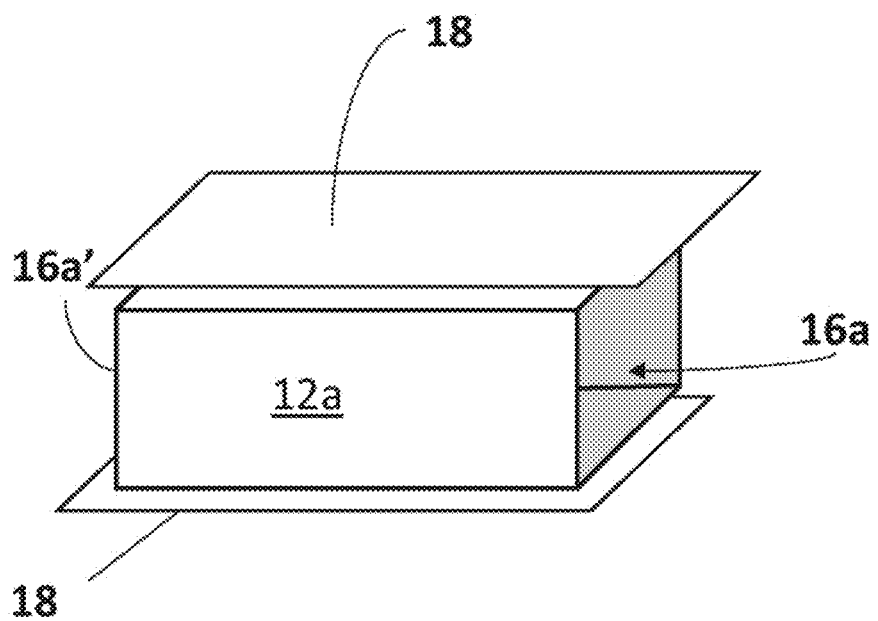
FIG. 1B is an isometric view of an interchangeable cooking module within the modular cooking appliance from FIG. 1A, according to one embodiment.

With reference now to FIG. 1B, there is illustrated an isometric view of interchangeable cooking module 12a, in accordance with one embodiment. As shown, interchangeable cooking module 12a includes a space for containing an oven (not shown) and two openings, such as openings 16a and 16a', on both ends of the space for containing an oven. Along the longitudinal axis, the upper half of interchangeable cooking module 12a is substantially identical to the lower half of interchangeable cooking module 12a such that either opening 16a or opening 16a' can be used for passage of food items, depending on the orientation of interchangeable cooking module 12a within housing 11. During assembly, one of openings 16a and 16a' can be closed up with aback wall (see FIG. 1C), after the orientation of interchangeable cooking module 12a within housing 11 has been decided.

The top and bottom of interchangeable cooking module 12a are formed by insulating surfaces 18. Insulating surfaces 18 include a filling envelope that can be filled with a substance of high specific-heat. For example, after an oven has been placed within interchangeable cooking module 12a, a liquid containing a high specific-heat substance in suspension, such as sand or salt suspended in silicone, can be injected into the filling envelope within insulating surfaces 18 until insulating surfaces 18 are fully expanded into the space between insulating surfaces 18 and the oven. Heat energy is stored in the high specific-heat substance when the oven is being heated.

Figure 1C:
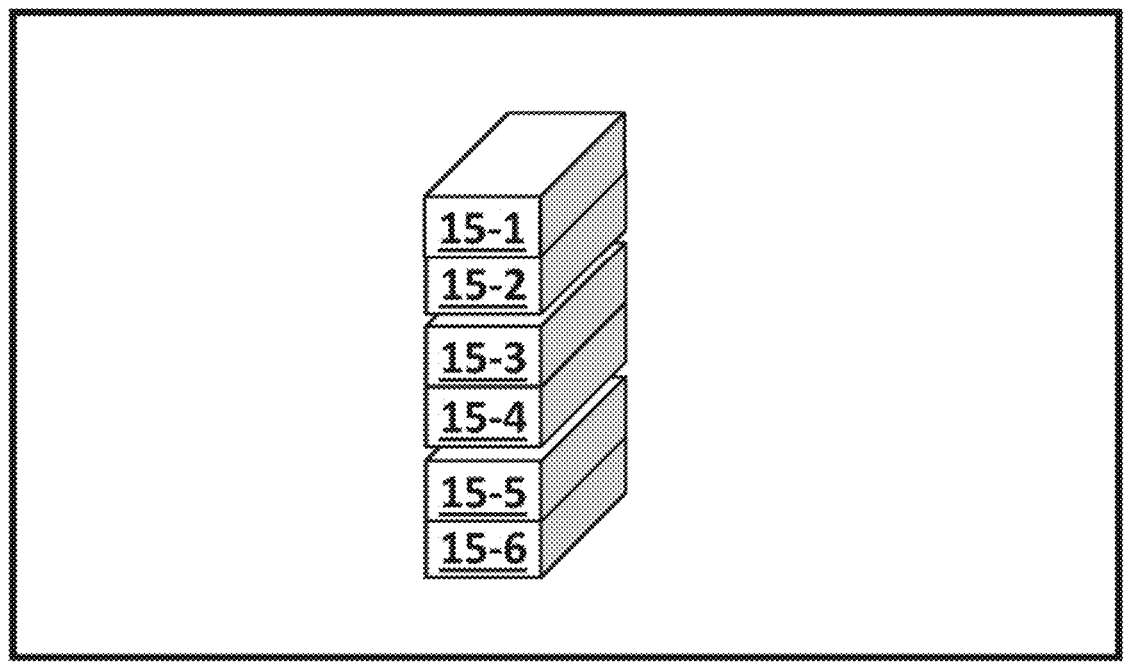
FIG. 1C is an isometric view of a back wall within the interchangeable cooking module from FIG. 1B, according to one embodiment.

Referring now to FIG. 1C, there is illustrated an isometric view of a back wall within interchangeable cooking module 12a from FIG. 1B, in accordance with one embodiment. As shown, a back wall includes a set of connectors 15-1 to 15-6. During assembly, an oven module to be placed within interchangeable cooking module 12a is fully seated therein in order to achieve a connection between a subset of connectors 15-1 to 15-6 and the oven module. In accordance with another embodiment, and as described later herein in connection with FIG. 10, these connectors 15-1 to 15-6 are provided as part of a spine 100 of housing 11 instead of as part of a back wall of interchangeable cooking module 12a. Each oven type includes a specific set of electrical connectors to be mated with the corresponding ones of connectors 15-1 to 15-6 in order to activate the proper electrical and control network for the operations of the oven. For example, an impingement oven includes electrical connectors for mating with connectors 15-1 and 15-4, a convection oven includes electrical connectors for mating with connectors 15-2 and 15-5, and a microwave oven includes electrical connectors for mating with connectors 15-3 and 15-6.

B. Impingement Oven

Figure 2A:
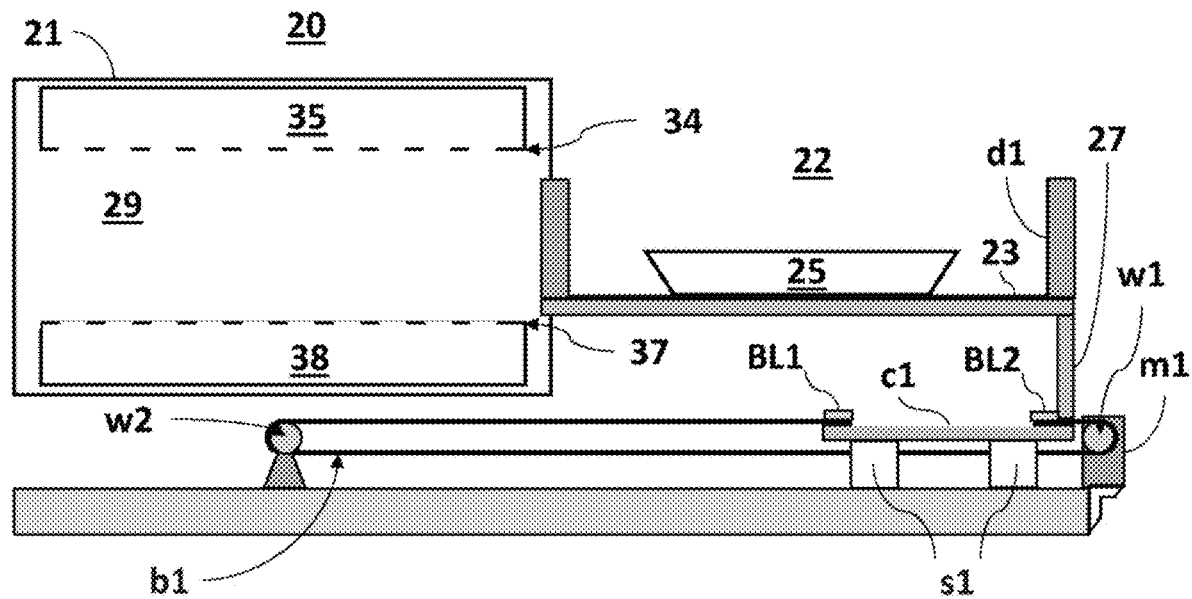
FIGS. 2A-2C are cross-sectional views of an impingement oven within the modular cooking appliance from FIG. 1, according to one embodiment.
Figure 2B:
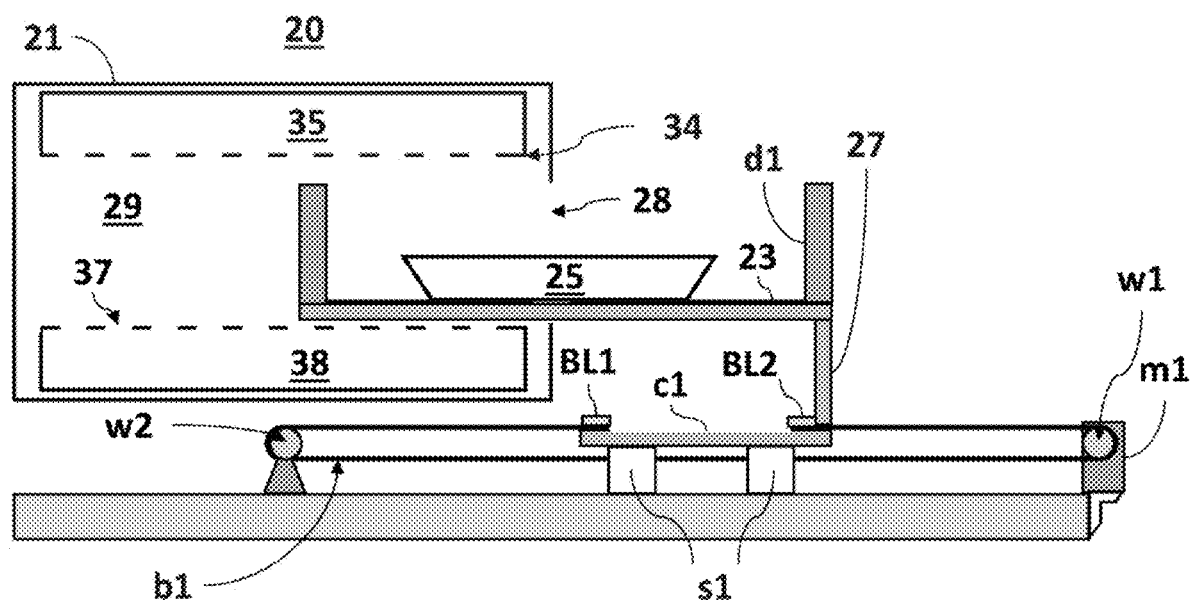
Figure 2C:
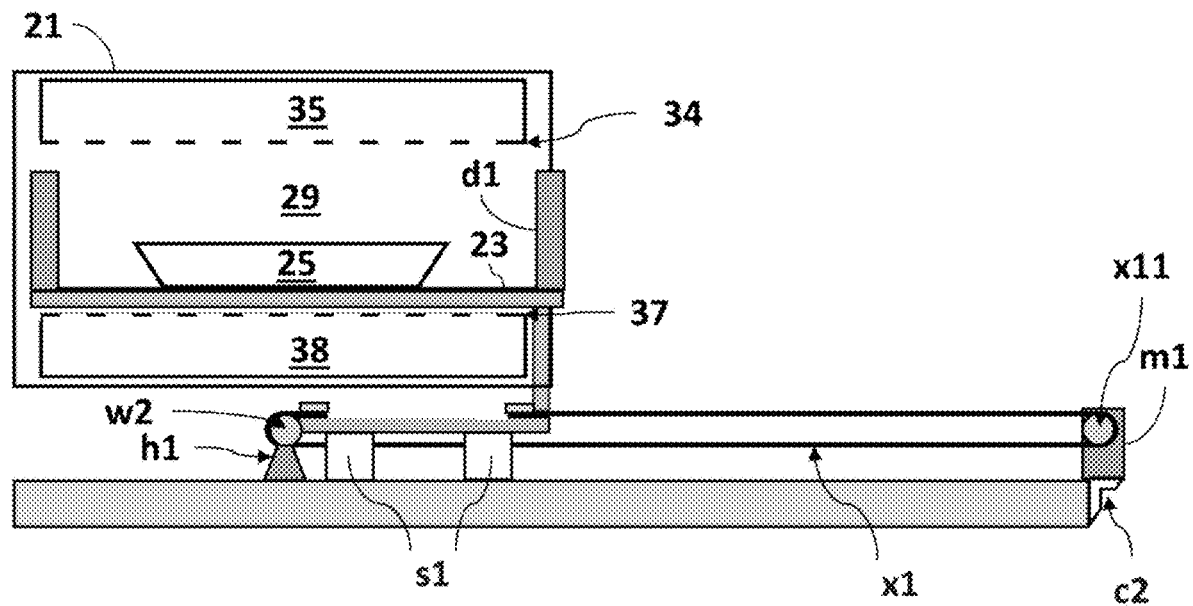

With reference now to FIGS. 2A-2C, there are depicted cross-sectional views of an impingement oven within interchangeable cooking module 12a of modular cooking appliance 10 from FIG. 1, in accordance with one embodiment. As shown, an impingement oven 20 includes a housing 21 for accommodating a cavity 29 and a cavity opening 28. Impingement oven 20 also includes a substantially planar food loading platform 23. Food loading platform 23 is configured to receive a cooking plate 25. Any food item intended to be cooked by impingement oven 20 is initially placed on either cooking plate 25 or food loading platform 23. When food items are being cooked, food loading platform 23 and cooking plate 25 are located inside cooking cavity 29, as shown in FIG. 2C.

In addition, housing 21 also contains a top plenum 35 and a bottom plenum 38. Top plenum 35 is connected to top air inlet plate 34. Bottom plenum 38 is connected to a bottom air inlet plate 37. Top air inlet plate 34, top plenum 35, bottom air inlet plate 37 and bottom plenum 38 are part of the heating and airflow system for impingement oven 20 such that heated air in top plenum 35 and bottom plenum 38 are in gaseous communication with cavity 29 through top air inlet plate 34 and bottom air inlet plate 37, respectively. Top air inlet plate 34 and bottom air inlet plate 37 include multiple openings for directing hot pressurized airstream towards any food items placed on food loading platform 23 located within cavity 29. It is understood by those skilled in the art that top plenum 35 or bottom plenum 38 could be in gaseous communication with cavity 29 via a variety of air opening configurations such as circular openings, nozzles, tubes, rectangular openings and the like. Moreover, air can enter cavity 29 through only one of top plenum 35 or bottom plenum 38.

Impingement oven 20 is also associated with a food transport system 22. As shown, food transport system 22 includes food loading platform 23 connected to a food transport carriage c1 via a connector 27. Food loading platform 23 can be transported in and out of cooking cavity 29 by a belt drive mechanism that includes a belt b1, a belt drive wheel w1 that is driven by a belt drive motor m1 and an opposing belt wheel w2. Belt b1 is connected to carriage c1 via belt locks BL1 and BL2. Carriage c1 is connected to carriage skids s1. For the present embodiment, there are four carriage skids connected to carriage c1, with two front carriage skids s1, as shown in FIG. 2A, and two back carriage skids (not shown) on the opposing side of carriage c1. Belt b1 moves between front carriage skids s1 and back carriage skids. When belt drive motor m1 is engaged, belt b1 moves carriage c1, thereby transporting food loading platform 23 in and out of cooking cavity 29 through opening 28, as shown in FIG. 2B.

During the cooking process, food loading platform 23 may be moved to and fro, about one inch, for promoting food cooking evenness. In order to move food loading platform 23 to and fro without air escaping through opening 28 during the cooking process, door d1 must be sufficiently thick to substantially block air from escaping through opening 28 at either extreme of the to and fro motion.

Operating parameters for impingement oven 20 to cook any food items placed on cooking plate 25 to be carried into cooking cavity 29 can be entered via control panel 17 (from FIG. 1).

Figure 3:
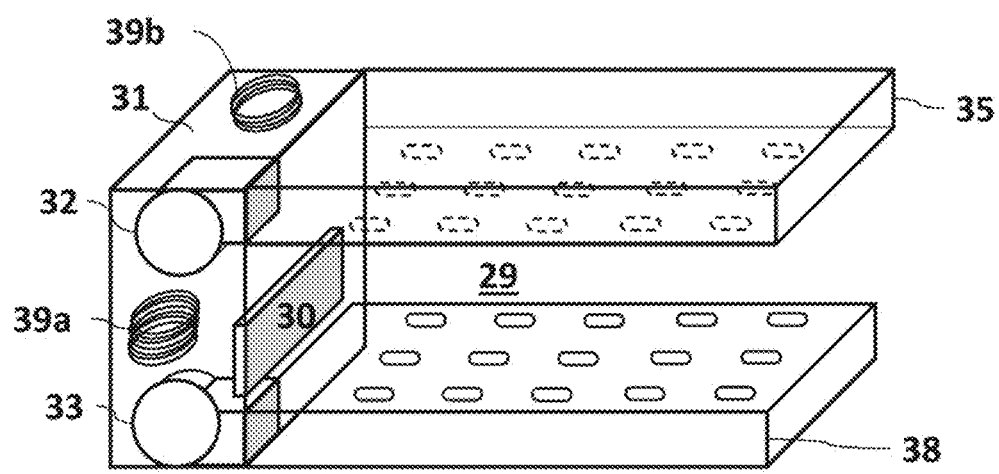
FIG. 3 is a diagram of the heating and airflow system within the impingement oven from FIGS. 2A-2C, according to one embodiment.

With reference now to FIG. 3, there is depicted a diagram of the heating and airflow system within impingement oven 20, in accordance with one embodiment. Air within cooking cavity 29 is initially pumped in to a heater plenum 31 via an intake opening 30. Heater plenum 31 includes a base heater 39a and a boost heater 39b. After air has been sufficiently heated by base heater 39a and boost heater 39b, the heated air is then directed to top plenum 35 via atop blower 32 and to a bottom plenum 38 via a bottom blower 33. During cooking, base heater 39a is usually turned on, and boost heater 39b is only activated when necessary. The pressurized hot air formed within top plenum 35 is subsequently directed to cavity 29 via multiple openings located on top air inlet plate 34 (from FIGS. 2A-2C). Similarly, pressurized hot air formed within bottom plenum 38 is subsequently directed to cavity 29 via multiple nozzles located on bottom air inlet plate 37 (from FIGS. 2A-2C). Although heated air is shown to be sent to top air plenum 35 and bottom plenum 38 via separate blowers, it is understood by those skilled in the art that heated air can be sent to both top plenum 35 and bottom plenum 38 via a single blower.

C. Convection Oven

Figure 4:
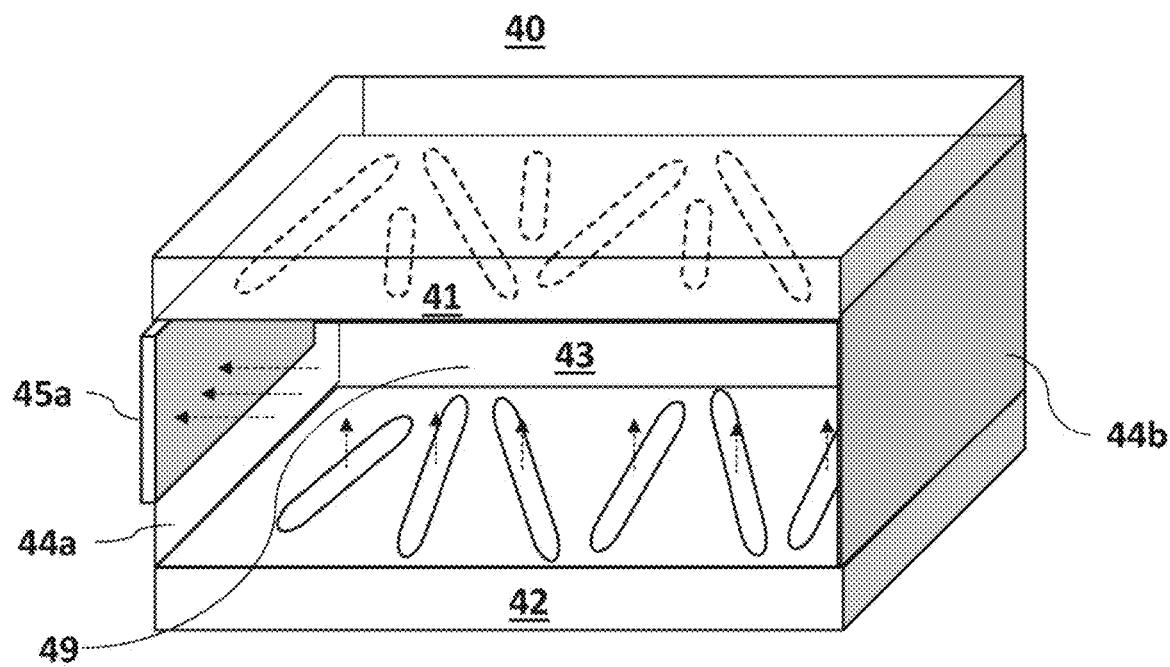
FIG. 4 is an isometric view of a convection oven within the modular cooking appliance from FIG. 1, according to one embodiment.

With reference now to FIG. 4, there is depicted an isometric view of a convection oven within slot 12b of modular cooking appliance 10 from FIG. 1, in accordance with one embodiment. As shown, a convection oven 40 includes a housing having a cooking cavity 49 defined by a top air inlet plenum 41, a bottom air inlet plenum 42, a rear wall 43, and two side walls 44a, 44b. Located on one or more of side walls 44a, 44b and rear wall 43 are return air openings, such as openings 45a, for returning air to a blower system (not shown). Preferably, convection oven 40 also includes a food loading mechanism similar to food loading mechanism 22 shown in FIGS. 2A-2C.

Figure 5:
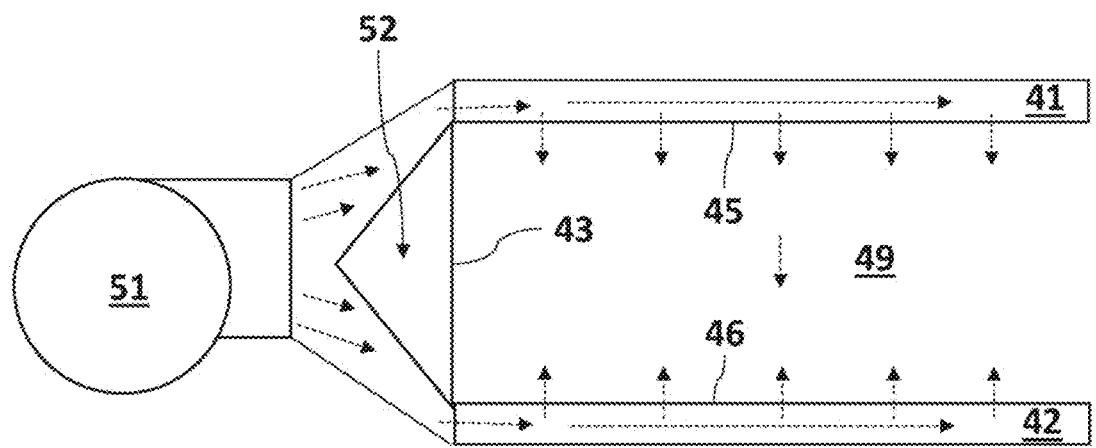
FIG. 5 is a diagram of a heating and airflow system within the convection oven from FIG. 4, according to one embodiment.

Referring now to FIG. 5, there is depicted a cross-sectional view of a heating and airflow system within convection oven 40, in accordance with one embodiment. As shown, a blower 51 is preferably located at the rear of convection oven 40. Heated air from a heater (not shown) is directed by blower 51 over triangular air diverter 52 that separates the air exiting blower 51 into top and bottom airstreams flowing through top and bottom air inlet plenums 41 and 42 and into cooking cavity 49 through top and bottom convection plates 45 and 46. After transferring heat from the heated air to food placed in cooking cavity 49, the air is drawn through return a return air path.

An operator can enter commands, such as cooking temperature, cooking time, fan speed, etc., via control panel 17 (from FIG. 1) to effectuate cooking controls on any food items placed within cooking cavity 49 of convection oven 40.

D. Microwave Oven

Figure 6A:
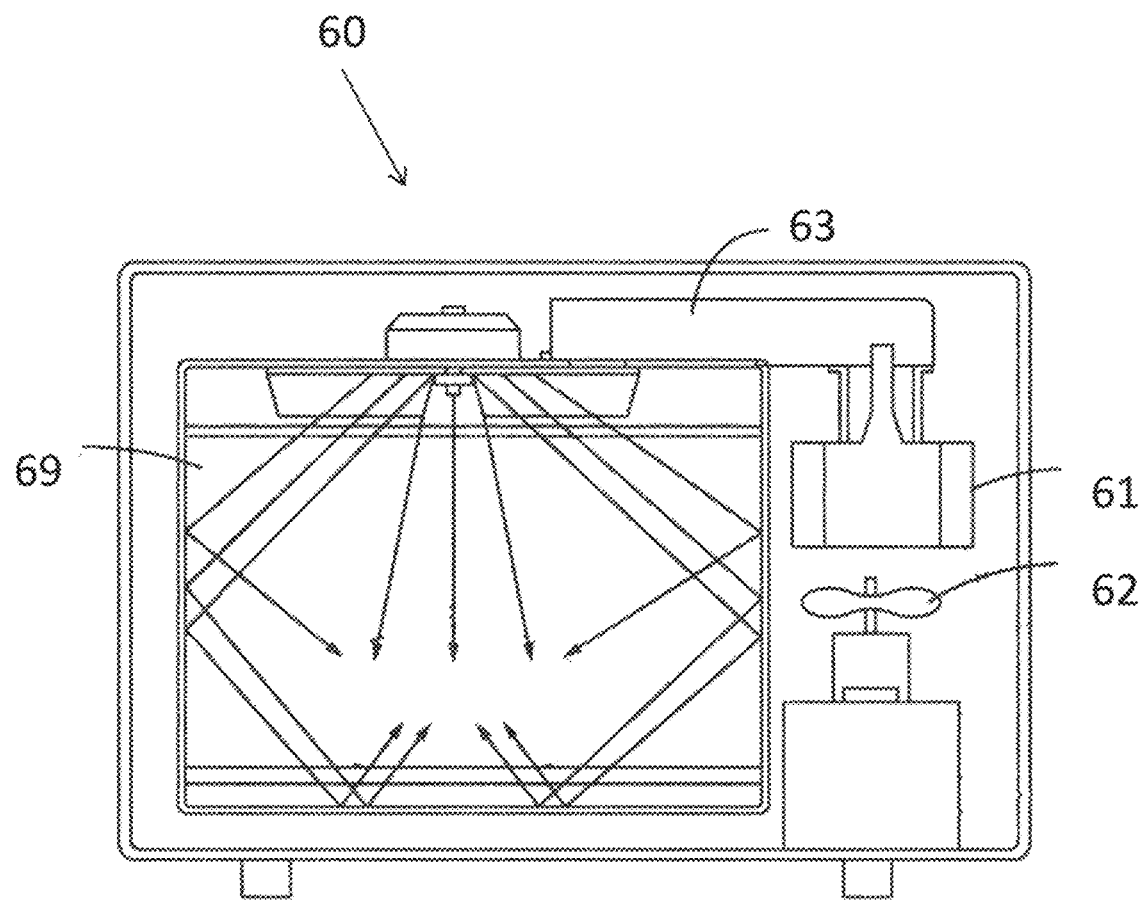
FIG. 6A is a front cross-sectional view of a microwave oven within the modular cooking appliance from FIG. 1, according to one embodiment.

With reference now to FIG. 6A, there is illustrated a front cross-sectional view of a microwave oven within interchangeable cooking module 12c of modular cooking appliance 10 from FIG. 1, according to one embodiment. As shown, a microwave oven 60 includes a cooking chamber 69 and at least one magnetron 61 configured to generate microwave radiation for cooking chamber 69. Microwave oven 60 may also include a second magnetron (not shown) that may be activated concurrently with, or independently from magnetron 61. Microwave oven 60 may further include one or more fans 62 for cooling magnetron 61 and/or generate air flow for more even heat distribution within cooking chamber 69. In some embodiments, microwave oven 60 further includes a waveguide 63 configured to direct and/or distribute the microwave radiation generated by magnetron 61 into cooking chamber 69.

Figure 6B:
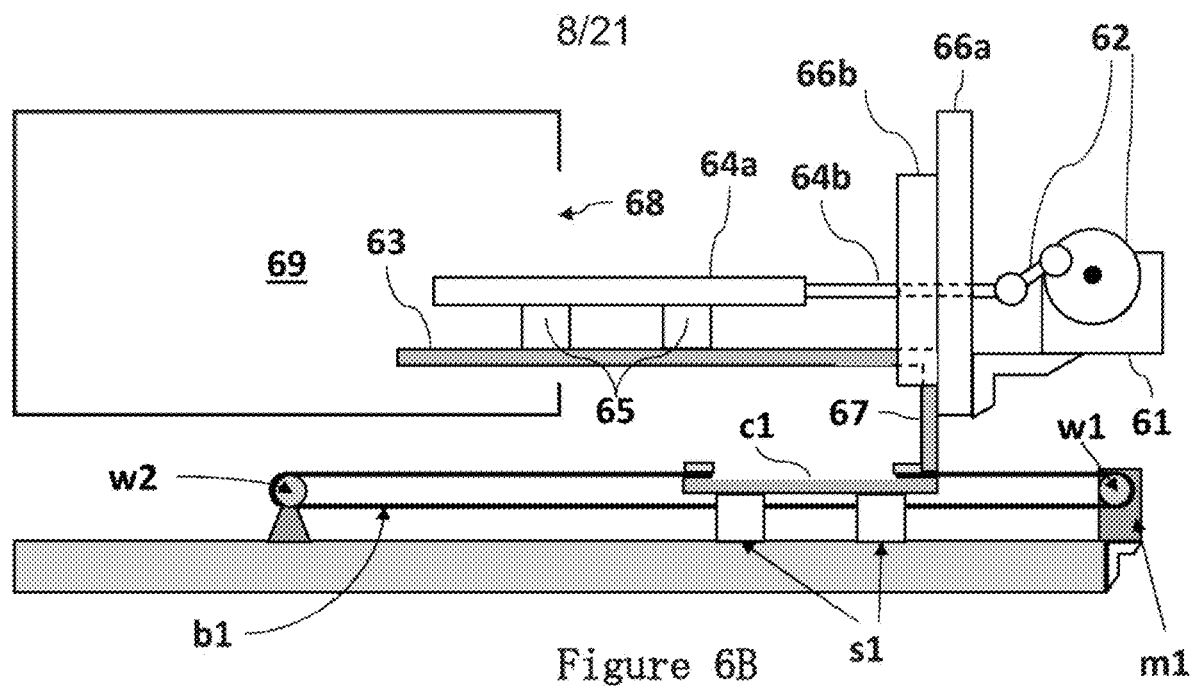
FIGS. 6B-6D are cross-sectional views of a food loading system within the microwave oven from FIG. 6A, according to one embodiment.
Figure 6C:
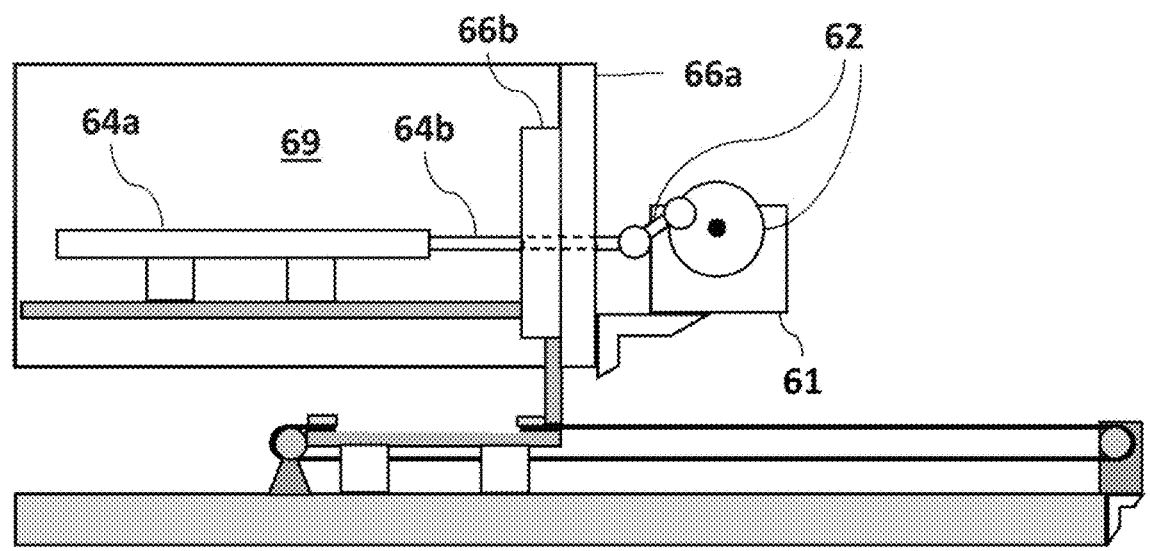
Figure 6D:
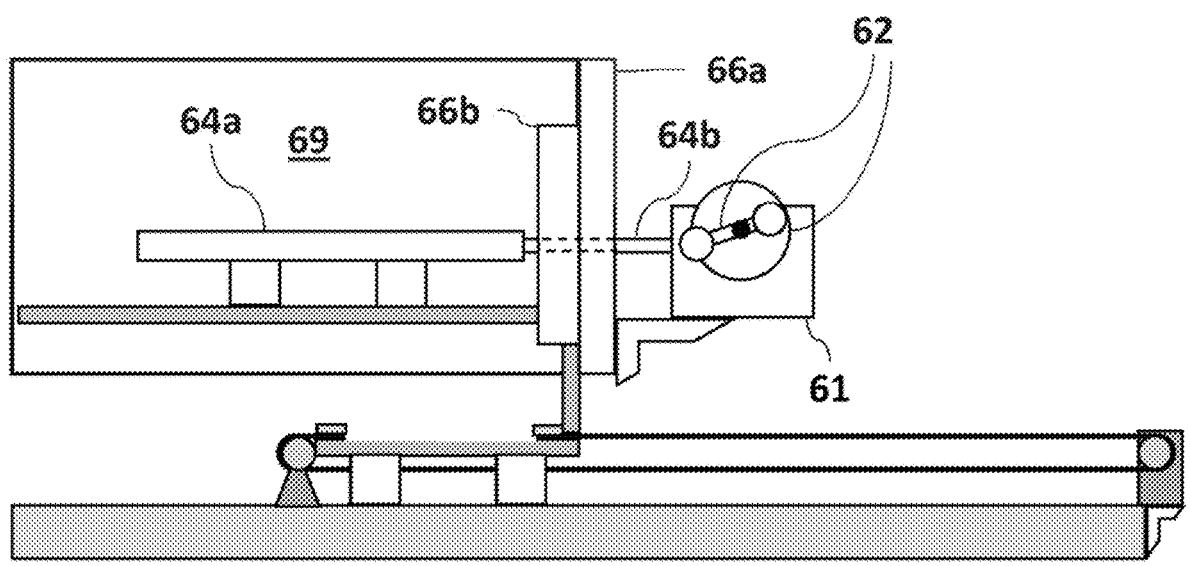

With reference now to FIGS. 6B-6D, there is illustrated cross-sectional views of a food transport and cooking evenness mechanism for microwave oven 60, according to one embodiment. As shown, a platform 63 is connected to a food transport carriage c1 via a connector 67. Platform 63 can be transported in and out of cooking cavity 69 by a belt drive mechanism that includes a belt b1, a belt drive wheel w1 that is driven by a belt drive motor m1 and an opposing belt wheel w2. Carriage c1 is connected to carriage skids s1. For the present embodiment, there are four carriage skids connected to carriage c1, with two front carriage skids s1, as shown in FIG. 6B, and two back carriage skids (not shown) on the opposing side of carriage c1. Belt b1 moves between front carriage skids s1 and back carriage skids. When belt drive motor m1 is engaged, belt b1 moves carriage c1, thereby transporting platform 63 in and out of cooking cavity 69 through opening 68, as shown in FIG. 6B.

Food surface 64a is connected to and supported by skids 65 which rest on platform 63. Food may be placed directly on food surface 64a or preferably on a dish or plate (not shown) which is then placed on food surface 64a. Food surface 64a is connected to crank-and-cam mechanism 62 via rod 64b which penetrates door 66a and door shunt 66b.

During cooking, as shown in FIGS. 6C-6D, food surface 64a may be moved to and fro within cooking chamber 69 for promoting food cooking evenness. In order to move food surface 64a to and fro within cooking chamber 69, a motor 61 and a crank-and-cam mechanism 62 are utilized to move a rod 64b connected to food surface 64a. Motor 61 is located outside an oven door formed by an external cover 66a and an internal cover 66b. External cover 66a and internal cover 66b are specifically designed to prevent microwave radiation from escaping through opening 68 during the cooking process. Two small concentric openings, which are approximately 0.3 inch in diameter, are provided in external cover 66a and internal cover 66b to allow rod 64b to go through. The wavelength of microwaves is approximately 12 cm, and the diameter of each of the two small concentric openings needs to be small enough to prevent microwave radiation from escaping through the openings. During the cooking process, crank-and-cam mechanism 62 translates the rotational movement from motor 61 into a linear reciprocating movement to move food surface 64a to and fro within cooking chamber 69. Food surface 64a can be moved on top of platform 63 via skids 65.

For the present embodiment, motor 61 and crank-and-cam mechanism 62 are utilized to translate a rotational movement to a linear reciprocating movement. It is understood by those skilled in the art that other mechanisms can be utilized to translate a rotational movement to a linear reciprocating movement, or to provide a linear reciprocating movement directly.

Operating parameters for microwave oven 60 to cook any food items placed within cooking cavity 69 can be entered via control panel 17 (from FIG. 1).

II. Controller

Modular cooking appliance 10 may include various oven types, but it is also able to be powered by a single-phase 50-Amp outlet as sole power source via a single power plug. Thus, modular cooking appliance 10 can be employed by any food service establishments without additional modification to the commonly found single-phase 50-Amp outlets.

Figure 7:
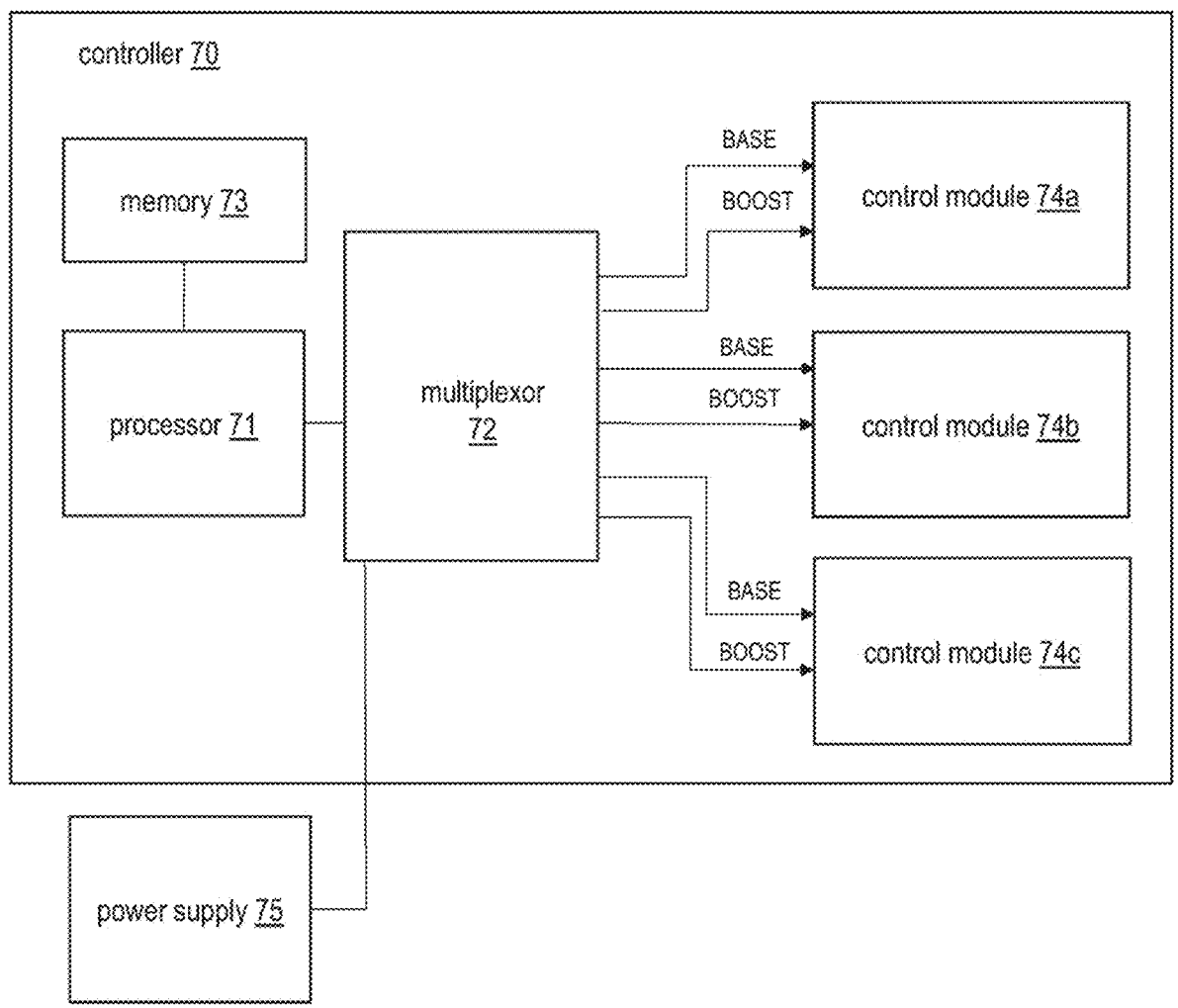
FIG. 7 is a block diagram of a controller for controlling various oven modules within the modular cooking appliance from FIG. 1, according to one embodiment.

Referring now to FIG. 7, there is depicted a block diagram of a controller for controlling various oven modules within modular cooking appliance 10, according to one embodiment. As shown, a controller 70 includes a processor 71, a multiplexor 72, a memory 73 and control modules 74a-74c. Control modules 74a-74c are shown in FIG. 7 as being part of controller 70 to indicate that the control modules 74a-74c are part of the control system of modular cooking appliance 10. As described later herein, one of ordinary skill in the art will appreciate that control modules 74a-74c do not need to be located within the housing 11 of modular cooking appliance 10 or be part of the interchangeable cooking modules 12a-12c, but can instead be included as part of the ovens. Memory 73 includes random-access memories and read-only memories that are non-erasable as well as electronically programmable. Software and data related to the operations of modular cooking appliance 10 are stored within memory 73.

Control module 74a is associated with the oven contained in interchangeable cooking module 12a (from FIG. 1A), control module 74b is associated with the oven contained in interchangeable cooking module 12b, and control module 74c is associated with the oven contained in interchangeable cooking module 12c. During operation, control modules 74a-74c monitor the real-time current consumption of their associated ovens and distribute current to their associated ovens, as needed, from a power supply 75 and multiplexor 72.

All ovens within modular cooking appliance 10 that cook with hot air, such as impingement oven 20 and convection oven 40 (and rapid-cook ovens), are provided with a base heater and at least one boost heater. For example, impingement oven 20 includes base heater 39a and boost heater 39b (see FIG. 3). All ovens within modular cooking appliance 10 that cook with microwaves, such as microwave oven 60 (and rapid-cook ovens), are provided with at least one magnetron. For example, microwave oven 60 includes magnetron 61 (see FIG. 6). If microwave oven 60 is provided with a second magnetron, it may be activated independently from magnetron 61.

As shown in FIG. 7, multiplexor 72 may direct current from power supply 75 to base heaters and boost heaters of the ovens within modular cooking appliance 10. In alternative embodiments, the multiplexor 72 may not be used to direct current from power supply 75 to base heaters of the ovens within modular cooking appliance 10. In additional embodiments, rapid-cook ovens within modular cooking appliance 10, which cook food items using both microwaves and hot air, may each include a separate multiplexor to share power between the rapid-cook oven's magnetron and its base heater.

III. Adaptive Power Management

As mentioned above, modular cooking appliance 10 is configured with impingement oven 20, convection oven 40 and microwave oven 60, for the present embodiment, with all the ovens operating from a single-phase 50-Amp outlet commonly found in commercial kitchens. However, those skilled in the art will appreciate that modular cooking appliance 10 may have any number and types of ovens (including rapid-cook ovens) all powered by a single power plug. For the present embodiment, the maximum current drawn by each of impingement oven 20, convection oven 40 and microwave oven 60 are as follows:

|  | component | max. current drawn |
|---|---|---|
| impingement oven 20 | base heater | 8 Amps |
|  | first boost heater | 12 Amps |
|  | second boost heater | 12 Amps |
| convection oven 40 | base heater | 4 Amps |
|  | first boost heater | 12 Amps |
|  | second boost heater | 12 Amps |
| microwave oven 60 | first magnetron | 8 Amps |
|  | second magnetron | 8 Amps |

In addition, the baseline current drawn by a the ancillary components (such as processor 71, multiplexor 72, memory 73, etc.) within modular cooking appliance 10 during operation is 5 Amps. Thus, with a 50-Amp power source, a maximum of (50−5=) 45 Amps current is available for powering ovens at any given time.

Needless to say, there are many benefits if more than one oven within modular cooking appliance 10 can be utilized to cook food items at the same time. However, as shown above, the maximum current drawn by impingement oven 20 is (8+12+12=) 32 Amps, and the maximum current drawn by convection oven 40 is (4+12+12=) 28 Amps. Thus, it is not possible to use both impingement oven 20 and convection oven 40 for cooking food items at the same time because the total current drawn by the two ovens (and all the ancillary components) would exceed the 50-Amp limitation.

In order to overcome the above-mentioned 50-Amp barrier, modular cooking appliance 10 employs Adaptive Power Management™ (APM) technology to intelligently allocate current to each of the ovens such that multiple ovens can be utilized for cooking food items concurrently during some of the time. There are two control modes under APM, namely, temperature-control mode and time-control mode.

A. Temperature-Control Mode

When cooking a food item under temperature-control mode, the oven temperature is monitored, and a temperature-control feedback loop is utilized to control the oven temperature for cooking the food item. Specifically, the base and boost heaters within an associated oven are turned on when the measured oven temperature drops below a set cook temperature, and the base and boost heaters within the associated oven are turned off when the measured oven temperature is at or above the set cook temperature.

During temperature-control mode, the amount of time an oven is turned on and the associated current drawn during the cook cycle are recorded and stored in a Current Drawn History Table (more details below) to be used in time-control mode described below, when necessary.

B. Time-Control Mode

When cooking a food item under time-control mode, the oven temperature and time for cooking the food item are guided by the information previously stored in a Current Drawn History Table (more details below). Specifically, the base and boost heaters within an associated oven are allocated the power during each time unit that was consumed by that oven for cooking the same food item when operating under temperature-control mode, as recorded in the Current Drawn History Table.

Iv. Control Tables

The following three control tables are utilized by modular cooking appliance 10 to perform APM during various cook cycles. The control tables can be stored in memory 73 (from FIG. 7), and the information within some of the control tables will be updated throughout the course of operating modular cooking appliance 10.

A. Food Entry Table

Before modular cooking appliance 10 can be deployed for cooking different types of food items, information regarding these food items has to be entered and stored (i.e., pre-programmed) in a Food Entry Table (FET) within memory 73. The FET contains a list of all the food items that can be cooked via the various ovens within modular cooking appliance 10 and their respective optimal cook settings. Basically, for each food item intended to be cooked via modular cooking appliance 10, an operator needs to enter into the FET a food item name, an oven type and cook settings (such as cook time, blower speed, cook temperature, etc.) that are associated with the food item.

With reference now to FIG. 8A, there is depicted an example FET, according to one embodiment. In this FET example, four types of food items are listed, namely, pizza, sandwich, biscuits and hot dog. In addition, three separate cook stages are shown, and each cook stage contains cook settings such as start and stop times, cook temperature, blower speed and magnetron power level. Specifically, entry one and entry two include the cook settings for cooking pizza and sandwich, respectively, in an impingement oven (such as impingement oven 20). Entry three includes the cook settings for cooking biscuits in a convection oven (such as convection oven 40) and entry four includes the cook settings for cooking hot dog in a microwave oven (such as microwave oven 60).

For each of entry one through entry three, when the corresponding cook settings are deployed, the ovens will be engaged in hot air cooking, as indicated by the associated air temperatures and blower speeds. For entry four, when that cook setting is deployed, the microwave oven will be engaged in microwave cooking, as indicated by a magnetron setting greater than zero in stages 1 and 3.

B. Maximum Current Drawn Table

The Maximum Current Drawn Table contains the maximum current required for each of impingement oven 20, convection oven 40 and microwave oven 60 to cook various food items, corresponding to the food item list stored in the FET.

With reference now to FIG. 8B, there is depicted an example Maximum Current Drawn Table. As shown, the Maximum Current Drawn Table includes an oven module column, a food name column, and multiple cook stage columns. In this example, entry one includes the maximum current drawn by impingement oven 20 for cooking pizza for a duration of 90 seconds, which corresponds to entry one of the FET from FIG. 8A. Entry two includes the maximum current drawn by impingement oven 20 for cooking sandwich for a duration of 70 seconds, which corresponds to entry two of the FET from FIG. 8A. Entry three includes the maximum current drawn by convection oven 40 for cooking biscuits for a duration of 120 seconds, which corresponds to entry three of the FET from FIG. 8A. Entry four includes the maximum current drawn by microwave 60 for cooking hot dog for a duration of 90 seconds, which corresponds to entry four of the FET from FIG. 8A.

Figure 9:
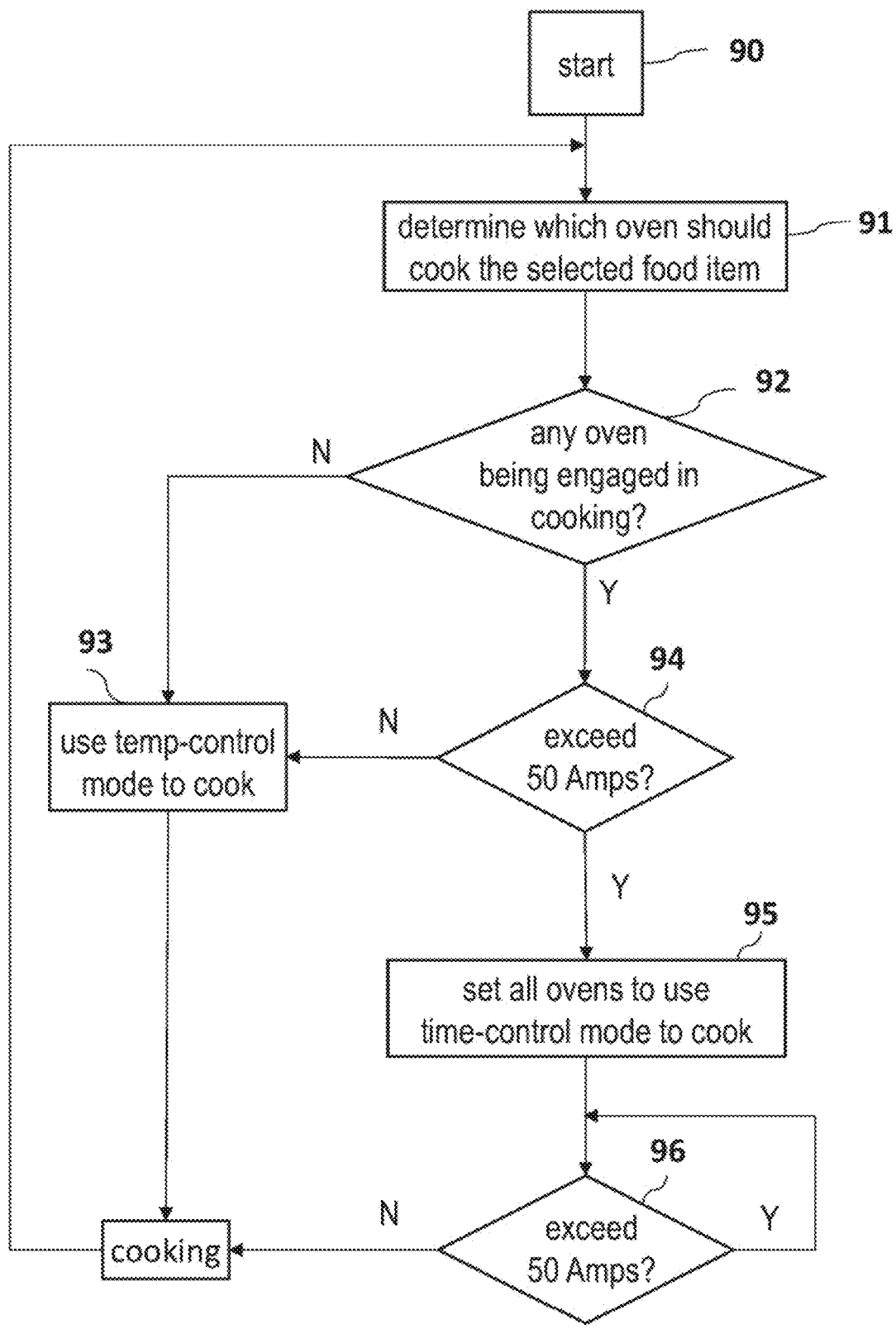
FIG. 9 is a flow diagram of a method for cooking food items via the modular cooking appliance from FIG. 1, according to one embodiment.

The information stored in the Maximum Current Drawn Table will be utilized to assist in the determination of whether or not a cook process should start when two or more ovens are called for cooking food items under temperature-control mode (as will be further explained in FIG. 9).

C. Current Drawn History Table

The Current Drawn History Table contains the current drawn by each of impingement oven 20 and convection oven 40 when it is engaged for cooking each type of food items under temperature-control mode per cook cycle.

With reference now to FIG. 8C, there is depicted an example Current Drawn History Table. As shown, the Current Drawn History Table includes an oven module column, a food name column, and multiple time unit columns. Each of the time units (time unit 1 to time unit 8 in this example) are identical in the length of time, and each time unit can be one second, two seconds, etc., depending on the time resolution required and the memory available within modular cooking appliance 10. The current drawn by each of impingement oven 20 and convection oven 40 when it is engaged for cooking a specific food item is recorded and stored in various time units accordingly throughout its entire cook cycle.

The current drawn value recorded in each time unit can be a running average of the current drawn of the most recent 10 cooks of each food item. For example, the 3.2 Amps current drawn value in time unit 1 is a running average of the current drawn of the most recent 10 cooks of pizza in time unit 1 by impingement oven 20. An operator can change the number of cooks for calculating the running average, and more than 10 cooks can be utilized to calculate the running average, depending on the accuracy needed.

Basically, modular cooking appliance 10 learns how much current was recently required in each time unit to cook each food item type in each of impingement oven 20 and convection oven 40 when cooking under temperature-control mode.

It is expected that the current drawn value recorded in each time unit may be drastically different even for the same oven, depending on the geographic location of the oven. For example, the current drawn values for an oven located in Denver, Colorado is expected to be significantly higher than the same oven located in Dallas, Texas. Thus, before the Current Drawn History Table can be fully deployed for regular day-to-day operations, it has to be initialized and populated with some actual historic current drawn values by performing a minimum number of pre-cooks, such as three, on location.

The information stored in the Current Drawn History Table will be utilized to assist in the determination of whether or not a cook process should be started when two or more ovens are called for cooking food items (as will be further explained in FIG. 9).

In addition, for each time unit, the activation status of the associated base heater and boost heater (not shown) can also be recorded and stored in the corresponding entry of the Current Drawn History Table.

Iv. Cooking Process

With reference now to FIG. 9, there is depicted a flow diagram of a method for cooking food items via modular cooking appliance 10, according to one embodiment. The ovens within modular cooking appliance 10 depends on the user configuration. The types of ovens included within modular cooking appliance 10 determine its "configuration." For the present embodiment, the types of ovens within modular cooking appliance 10 are impingement oven 20, convection oven 40 and microwave oven 60. After an operator has selected a food item to be cooked from a list of food items (i.e., food items stored in a FET from FIG. 8A) shown on display 17 (from FIG. 1), as shown in block 90, a determination is first made as to which of the ovens in the current configuration of modular cooking appliance 10 should cook the selected food item, as shown in block 91.

As shown in FIG. 8A, each Food Type in the FET has associated with it an "Oven Module" and the cook settings for that oven module type. For example, a pizza is associated with an impingement oven. In the present embodiment, the configuration of the modular cooking appliance 10 includes only one impingement oven 20. Thus, if an operator selects a pizza shown on display 17 (from FIG. 1), as shown in block 90, the controller 70 (from FIG. 7) will select the impingement oven 20 to cook the pizza and will send the cook settings for the pizza to the impingement oven 20, and the operator will be directed to load the pizza into the impingement oven 20. Similarly, if an operator selects a biscuit shown on display 17, the controller 70 will select the convection oven 40 and will send the cook settings for the biscuit to the convection oven 40, and the operator will be directed to load the biscuit into the convection oven 40; and, if an operator selects a hot dog shown on display 17, the controller 70 will select the microwave oven 60 and will send the cook settings for the hot dog to the microwave oven 60, and the operator will be directed to load the hot dog into the microwave oven 60.

Once the determination of which oven should cook the selected food item has been made, a determination is then made whether or not any of the ovens is currently being engaged in cooking food items, as shown in block 92. If none of the ovens is currently engaged in cooking food items, then temperature-control mode will be utilized for controlling the oven temperature of the selected oven to cook the selected food item throughout the entire cook process, as depicted in block 93. The cook cycle will be guided by the information stored within the FET.

However, if one (or more) oven is currently being engaged in cooking food items, then another determination is made whether or not the total current demand by the selected oven and the engaged oven (as well as the auxiliary components) to cook respective food items will exceed the 50-Amp limitation anytime during their entire respective cook cycle under temperature-control mode, as shown in block 94. This determination is made by looking up the Maximum Current Drawn Table to determine if the sum of the current drawn by the selected oven and the engaged oven (as well as the auxiliary components) for cooking their respective food item will exceed the 50-Amp limitation in any of the time units, for the same ovens cooking the same food types. If not, then the selected oven is allowed to cook the selected food immediately, and temperature-control mode can continually be used to control the oven temperature of the two ovens throughout the entire cook cycle, as depicted in block 93.

If the total current demand by the selected oven and the engaged oven (as well as the auxiliary components) to cook respective food items exceeds the 50-Amp limitation, then all the ovens will be set to use time-control mode for controlling oven temperature throughout the entire cook cycle, as depicted in block 95. In other words, any oven that is using temperature-control mode at the time will be switched to use time-control mode to complete the cook process.

For example, if a pizza is currently being cooked in impingement oven 20, and an operator wants to cook a biscuit in convection oven 40 at the same time, controller 70 checks the maximum current drawn by impingement oven 20 when cooking a pizza and the maximum current drawn by convection oven 40 when cooking a biscuit, by using the Maximum Current Drawn Table. In this example, the maximum current drawn by impingement oven 20 when cooking a pizza is 32 Amps, and the maximum current drawn by convection oven 40 when cooking a biscuit is 28 Amps, with a total maximum current drawn being (32+28=) 60 Amps, which means the cooking control within impingement oven 20 will be switched to time-control mode.

Next, a determination is made whether or not the total current demand by the selected oven and the engaged oven (as well as the auxiliary components) to cook respective food items will exceed the 50-Amp limitation anytime in any of the time units during their entire respective cook process under time-control mode, as shown in block 96. This determination is made by looking up the Current Drawn History Table to determine if the sum of the current drawn by the selected oven and the engaged oven (as well as the auxiliary components) does not exceed the 50-Amp limitation in each and every time unit throughout the entire cook cycle.

If the total current demand by the selected oven and the engaged oven (as well as the auxiliary components) to cook respective food items exceeds the 50-Amp limitation in any of the time units during their entire respective cook process under time-control mode, the selected oven has to wait until the total historic current drawn in each subsequent time unit is 50 Amps or less before it can start its cook process. Otherwise, if the total current demand does not exceed the 50-Amp limitation in any of the time units, both the selected oven and the engaged oven proceed with respective cooking under time-control mode.

For example, Table I (a portion of a Current Drawn History Table) shows it takes five time units for impingement oven 20 to cook a pizza, and the current drawn during the first to fifth time units are 20, 32, 32, 32 and 8 Amps, respectively. On the other hand, it takes three time units for convection oven 40 to cook a biscuit, and the current drawn during the first to third time units are 28, 16 and 16 Amps, respectively.

TABLE I

|  | time unit 1 | time unit 2 | time unit 3 | time unit 4 | time unit 5 |
| --- | --- | --- | --- | --- | --- |
| pizza | 20 | 32 | 32 | 32 | 8 |
| biscuit | 28 | 16 | 16 | | |

In this example, convection oven 40 can start cooking the biscuit in time unit 5 while the pizza is being cooked in impingement oven 20. This is because the current drawn by the two ovens and auxiliary components exceeds the 50-Amp limitation if biscuits begin cooking in any of time units 1-4 but not in time unit 5.

As described above, the configuration of modular cooking appliance 10 can be changed by swapping out the ovens in any one of interchangeable cooking modules 12a-12c contained within modular cooking appliance 10 without disturbing other aspects of modular cooking appliance 10. When the configuration of modular cooking appliance 10 is changed, the new configuration is recognized and internalized within modular cooking appliance 10 as follows. Each of the ovens used in the modular cooking appliance 10 is associated with its own control module. For example, in the present embodiment, impingement oven 20 is associated with control module 74a (FIG. 7), convection oven 40 is associated with control module 74b (FIG. 7), and microwave oven 60 is associated with control module 74c (FIG. 7).

Control modules 74a-74c are shown in FIG. 7 as being part of controller 70 to indicate that the control modules 74a-74c are part of the control system of modular cooking appliance 10. However, one of ordinary skill in the art will appreciate that the control modules 74a-74c do not need to be located within the housing 11 of modular cooking appliance 10 or be part of the respective interchangeable cooking modules 12a-12c. In accordance with embodiments of the present invention, each control module for an oven can be included as part of the oven. Thus, as shown in FIG. 10, control module 74a can be included as part of impingement oven 20, control module 74b can be included as part of convection oven 40, and control module 74c can be included as part of microwave oven 60.

In accordance with embodiments of the present invention, the control modules 74a-74c can have a common design and can be customizable to identify the type of oven that the control module is included in. In such embodiments, each of the control modules 74a-74c can have a DIP (dual in-line package) switch (not shown) and the individual switches of the DIP switch are positioned to identify the corresponding oven type. As described above, each oven type includes a specific set of electrical connectors (which are part of the oven's control module, for example control module 74a, 74b, or 74c) to be mated with the corresponding ones of connectors 15-1 to 15-6 (FIGS. 1C and 10) in order to activate the proper electrical and control network for the operations of the oven. For example, impingement oven 20 includes electrical connectors for mating with connectors 15-1 and 15-4, convection oven 40 includes electrical connectors for mating with connectors 15-2 and 15-5, and microwave oven 60 includes electrical connectors for mating with connectors 15-3 and 15-6. The DIP switches in each of the control modules 74a-74c set the proper connections within the set of electrical connectors of the oven to establish the proper connections between the oven and corresponding connectors 15-1 to 15-6.

Figure 10:
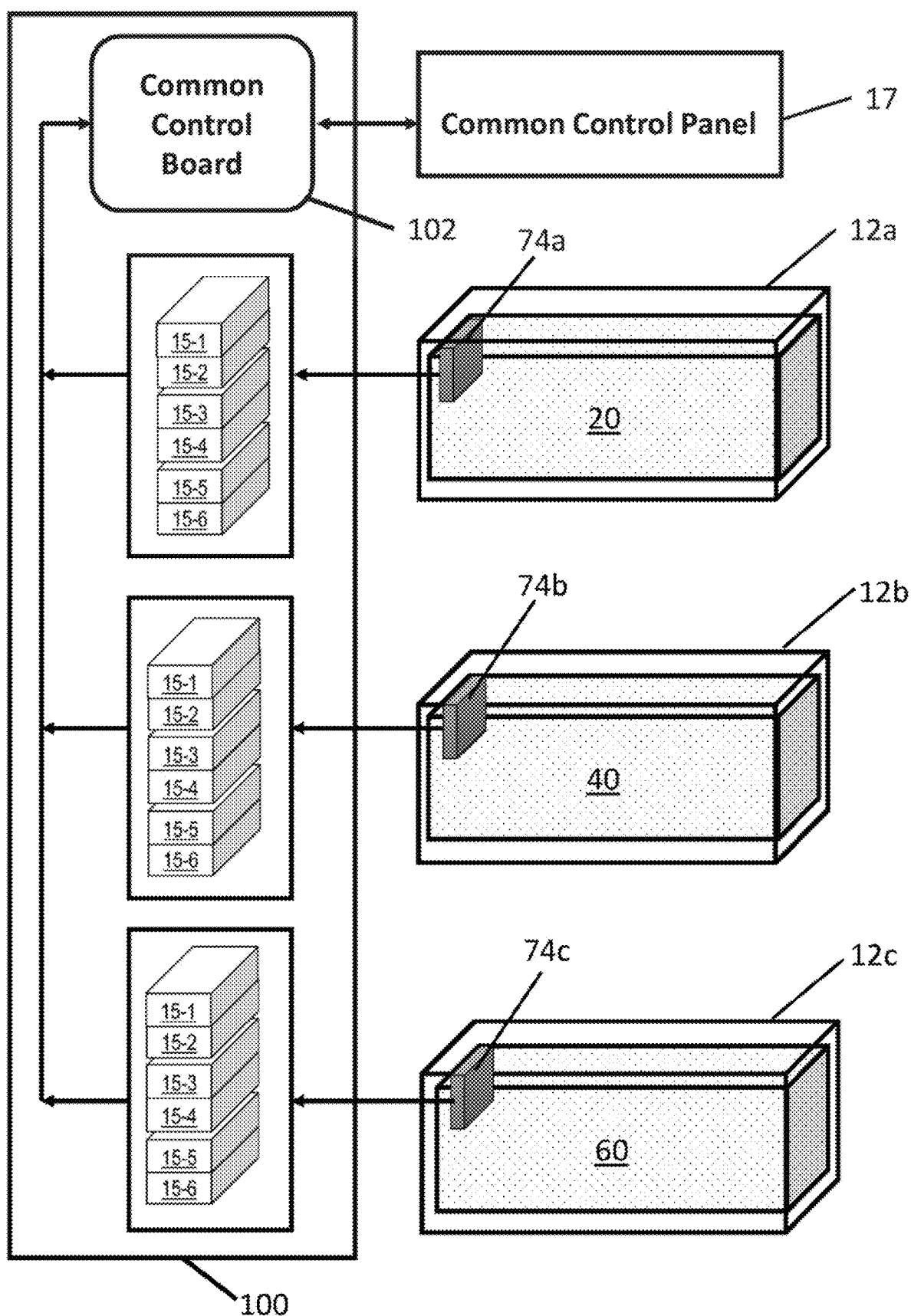
FIG. 10 is a schematic diagram of a modular cooking appliance, in accordance with one embodiment.

Referring to FIG. 10, when ovens are installed in modular cooking appliance 10, the set of electrical connectors of each oven (which are part of the oven's control module, for example, control module 74a, 74b, or 74c) are mated with the corresponding ones of connectors 15-1 to 15-6. These connectors 15-1 to 15-6 can be part of a spine 100 of housing 11. In embodiments, the electrical connections between the ovens in modular cooking appliance 10 and their corresponding connectors 15-1 to 15-6 can be implemented using bus-bar style connections. In alternative embodiments, the electrical connections between the ovens in modular cooking appliance 10 and their corresponding connectors 15-1 to 15-6 can be implemented using dedicated wire runs for each oven.

Spine 100 can also contain a common control board 102 for the modular cooking appliance 10. Controller 70 (FIG. 7), which can be part of the common control board 102, recognizes the connections between the set of electrical connectors of each installed oven and the corresponding connectors 15-1 to 15-6. Controller 70 hence recognizes and internalizes the resulting configuration of modular cooking appliance 10. One of ordinary skill in the art will understand that not all electrical connections from the ovens in modular cooking appliance 10 will necessarily go to common control board 102. In embodiments, just data and low power connections (e.g., data and low power wires) will go from the ovens to common control board 102. Spine 100 may also include other components, such as, for example, a DC power supply, power distribution circuitry, circuit protection circuitry, which are not shown in FIG. 10.

One aspect of this internalization is that certain of the food items (and their corresponding cook settings) listed in the FET are rendered unavailable for selection by the operator to reflect the absence of a corresponding oven in the configuration of modular cooking appliance 10. Referring now to FIG. 8A, if the configuration of modular cooking appliance 10 is changed to remove an impingement oven, then controller 70 will not display the "pizza" and "sandwich" food items from the FET on display 17 and will not activate "buttons" on display 17 that would enable selection of a pizza or a sandwich for cooking. Similarly, if the configuration of modular cooking appliance 10 is changed to remove a convection oven, then controller 70 will not display the "biscuit" food item from the FET on display 17 and will not activate a "button" on display 17 that would enable selection of a biscuit for cooking. Likewise, if the configuration of modular cooking appliance 10 is changed to remove a microwave oven, then controller 70 will not display the "hot dog" food item from the FET on control panel 17 and will not activate a "button" on control panel 17 that would enable selection of a hot dog for cooking.

Although certain of the food items (and their corresponding cook settings) listed in the FET are rendered unavailable for selection by the operator to reflect the removal of a corresponding oven in the configuration of modular cooking appliance 10, these food items (and their corresponding cook settings) are not deleted from the FET. Thus, if the configuration of modular cooking appliance 10 is later changed to once again include the removed ovens, the food items (and their corresponding cook settings) that were previously unavailable are once again made available for selection by the operator to reflect the presence of the corresponding oven in the configuration of modular cooking appliance 10.

Another aspect of this internalization is that the determination of which oven should cook a selected food item is modified to reflect that the new configuration of modular cooking appliance 10. For instance, in an alternative embodiment, modular cooking appliance 10 can include more than one of the same type of oven. For example, modular cooking appliance 10 can include two impingement ovens 20 and one microwave oven 60. As discussed above, in the FET shown in FIG. 8A, a pizza is associated with an impingement oven. In this alternative embodiment, if an operator selects a pizza on display 17 (from FIG. 1), as shown in block 90, the determination of which oven should cook the pizza, as shown in block 91, involves a determination of which one of the two impingement ovens 20 should cook the pizza. Once controller 70 (FIG. 7) makes this determination, it will send the cook settings for the pizza to the selected impingement oven 20 and will direct the operator to load the pizza into the selected impingement oven 20.

In making this determination, the controller 70 first determines whether or not the two impingement ovens 20 are currently being engaged in cooking food items. If both of the impingement ovens 20 are currently unavailable because they are both cooking food items, then the cooking of the pizza must wait until one of the impingement ovens 20 becomes available to cook the pizza. Alternatively, the controller 70 can add the pizza (and the cook settings for the pizza) to a "cook list" to be completed when one of the impingement ovens 20 becomes available to cook the pizza. If only one of the impingement ovens 20 is available to cook the pizza, then the controller 70 will send the cook settings for the pizza to the available impingement oven 20 and will direct the operator to load the pizza into the available impingement oven 20.

If neither of the impingement ovens 20 is currently being engaged in cooking food items, and both ovens are available to cook the pizza, the controller 70 will send the cook settings for the pizza to the impingement oven 20 that has been designated as the default impingement oven 20 and will direct the operator to load the pizza into the default impingement oven 20. The designation of one or the other of the two impingement ovens 20 within the modular cooking appliance 10 as the default impingement oven 20 is based on the preferences of food-service operators. For example, a food service operator may set up its modular cooking appliance 10 such that the impingement oven 20 that is the middle oven in the current configuration of the modular cooking appliance 10 is the default oven. In the alternative, the food-service operator may set up its modular cooking appliance 10 such that the two impingement ovens 20 alternate as the default oven.

Once the determination has been made as to which one of the two impingement ovens 20 should cook the pizza, a determination is then made as to whether the impingement oven 20 will cook the pizza in the temperature-control mode or in the time-control mode, based on whether the total current demand by the modular cooking appliance 10 would exceed the 50-Amp limitation if the selected impingement oven 20 cooks the pizza in the temperature-control mode. This determination is made in the same manner as described above with regard to the configuration of cooking appliance 10 that includes one impingement oven 20, one convection oven 40, and one microwave oven 60, and as depicted in FIG. 9.

One of ordinary skill in the art will appreciate that the foregoing description of which of more than one impingement oven 20 is selected by modular cooking appliance 10 to cook a selected food item applies as well to other configurations of modular cooking appliance 10 that include more than one convection oven 40, more than one microwave oven 60, or more than one of any other type of oven (e.g., a rapid-cook oven).

As described above, modular cooking appliance 10 has the ability to employ multiple cooking technologies within the same housing 11. Furthermore, the ovens inserted into the interchangeable cooking modules 12a-12c of modular cooking appliance 10 are capable of cooking a wide range of food items. Under these circumstances, presenting the various food items that can be cooked in a particular configuration of modular cooking appliance 10 to the operator in a clear and easily accessible way using control panel 17 (such as with minimal scrolling) presents a challenge. In embodiments, control panel 17 is implemented with a touch-screen display. In currently preferred embodiments, for example, display 17 is a 10-inch diagonal, color touch screen. Nonetheless, even such a relatively large user interface may not provide enough available space.

Figure 11A:
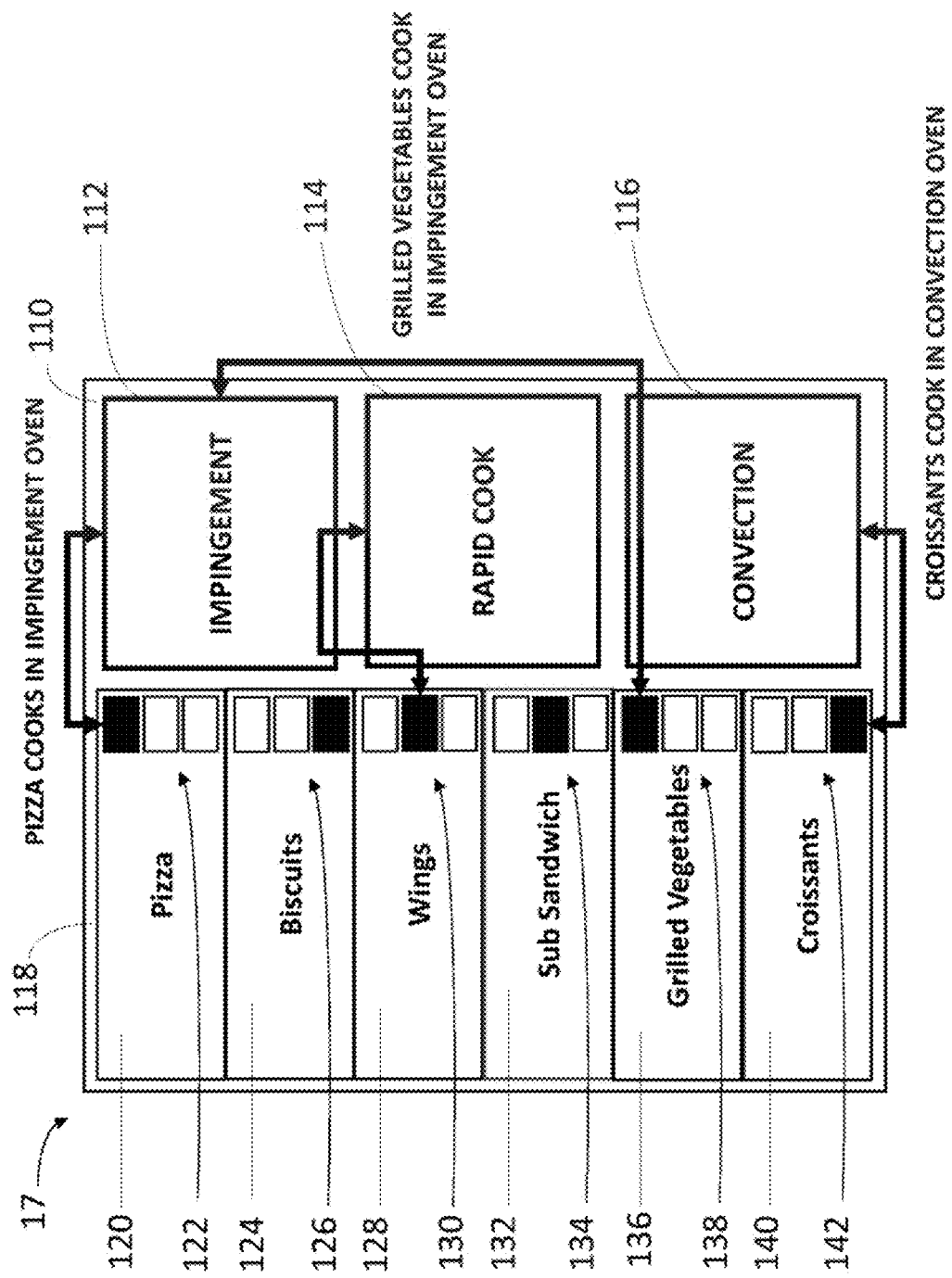
FIG. 11A shows an example of a user interface displayed on a control panel of the modular cooking appliance when its ovens are idling at their designated set temperatures, in accordance with one embodiment.

In accordance with additional exemplary embodiments of the present invention, modular cooking appliance 10 is configured to display a user interface on display 17. The user interface is separated into two sections which respectively identify which ovens are included in the current configuration of modular cooking appliance 10 and which food items can be cooked in the current configuration. FIG. 11A shows the information presented to the operator by the user interface displayed on display 17 for a configuration of modular cooking appliance 10 that includes an impingement oven, a rapid cook oven, and a convection oven. A first section 110 of the user interface displayed on display 17 includes subsections 112, 114, 116 that indicate that the impingement oven, the rapid cook oven, and the convection oven, respectively, are present in modular cooking appliance 10. Furthermore, the order that the ovens appear, from top to bottom, in subsections 112, 114, 116 of first section 110 corresponds to the order in which the impingement oven, the rapid cook oven, and the convection oven are present in interchangeable cooking modules 12a, 12b, 12c of housing 11 of modular cooking appliance 10.

A second section 118 of the user interface displayed on display 17 includes subsections 120, 124, 128, 132, 136, 140 that identify the food items that can be cooked in a particular configuration of modular cooking appliance 10. The food item can be identified using text, an image of the food item, an icon representing the food item, or any combination thereof. As shown in FIG. 11A, a configuration of modular cooking appliance 10 that includes an impingement oven, a rapid cook oven, and a convection oven can cook, among other food items, pizza, biscuits, wings, sub sandwiches, grilled vegetables, and croissants, as shown by subsections 120, 124, 128, 132, 136, 140, respectively, of second section 118. An operator initiates cooking of the particular food item by touching the subsection 120, 124, 128, 132, 136, 140 of second section 118 of the user interface that corresponds to the food item, without the need to separately touch another portion of display 17. In other words, the operator both selects the food item to be cooked and begins the cooking of that food item by modular cooking appliance 10 in a single step simply by touching the subsection 120, 124, 128, 132, 136, 140 of second section 118 of the user interface that corresponds to the food item.

Figure 11B:
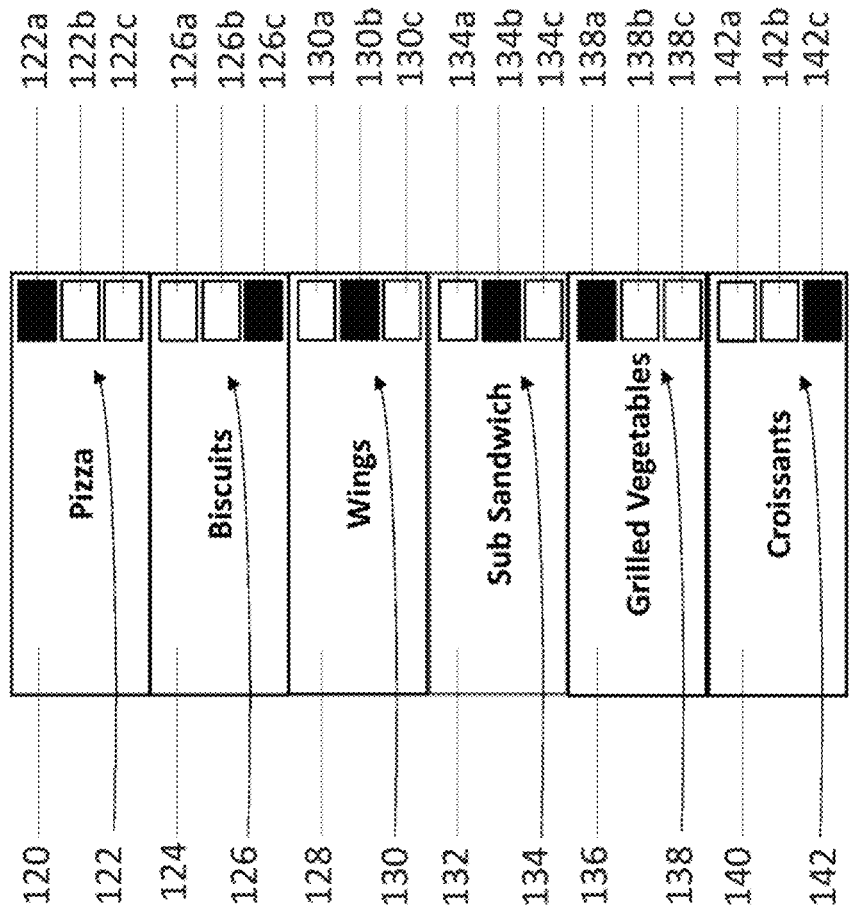
FIG. 11B shows a portion of the user interface shown in FIG. 11A.

In addition to identifying a food item, each subsection 120, 124, 128, 132, 136, 140 includes, respectively, a configuration diagram 122, 126, 130, 134, 138, 142 to inform an operator which oven has been designated to cook the food item identified within that subsection. As further depicted in FIG. 11B, each configuration diagram 122, 126, 130, 134, 138, 142 includes a number of oven designators that is equal to the number of ovens that are present in the current configuration of modular cooking appliance 10 and which are arranged in a manner that corresponds to the relative positions of the ovens in housing 11. Thus, as shown in FIGS. 11A and 11B, configuration diagrams 122, 126, 130, 134, 138, 142 respectively include oven designators 122a-122c, 126 a-126c, 130a-130c, 134 a-134c, 138a-138c, 142a-142c.

The oven designators 122a-122c, 126a-126c, 130a-130c, 134a-134c, 138a-138c, 142a-142c for a particular food item inform the operator of modular cooking appliance 10, at a glance, which oven has been designated to cook the food item. As shown in FIGS. 11A and 11B, the oven in modular cooking appliance 10 that has been designated to cook a particular food item is represented by a blackened oven designator 122a-122c, 126a-126c, 130a-130c, 134a-134c, 138a-138c, 142a-142c in the configuration diagram 122, 126, 130, 134, 138, 142 within the subsection 120, 124, 128, 132, 136, 140 for the food item. For example, referring to FIGS. 11A and 11B, the blackened oven designator 122a in configuration diagram 122 for "Pizza" indicates to the operator that the impingement oven has been designated to cook pizza. Likewise, the blackened oven designators 126c, 130b, 134b, 138a, and 142c in configuration diagrams 126, 130, 134, 138, 142, respectively, indicate to the operator that the impingement oven (i.e., the top oven in the current configuration of modular cooking appliance 10) is also designated to cook grilled vegetables; that the rapid cook oven (i.e., the middle oven in the current configuration of modular cooking appliance 10) is designated to cook wings and sub sandwiches; and that the convection oven (i.e., the bottom oven in the current configuration of modular cooking appliance 10) has been designated to cook biscuits and croissants.

Figure 12A:
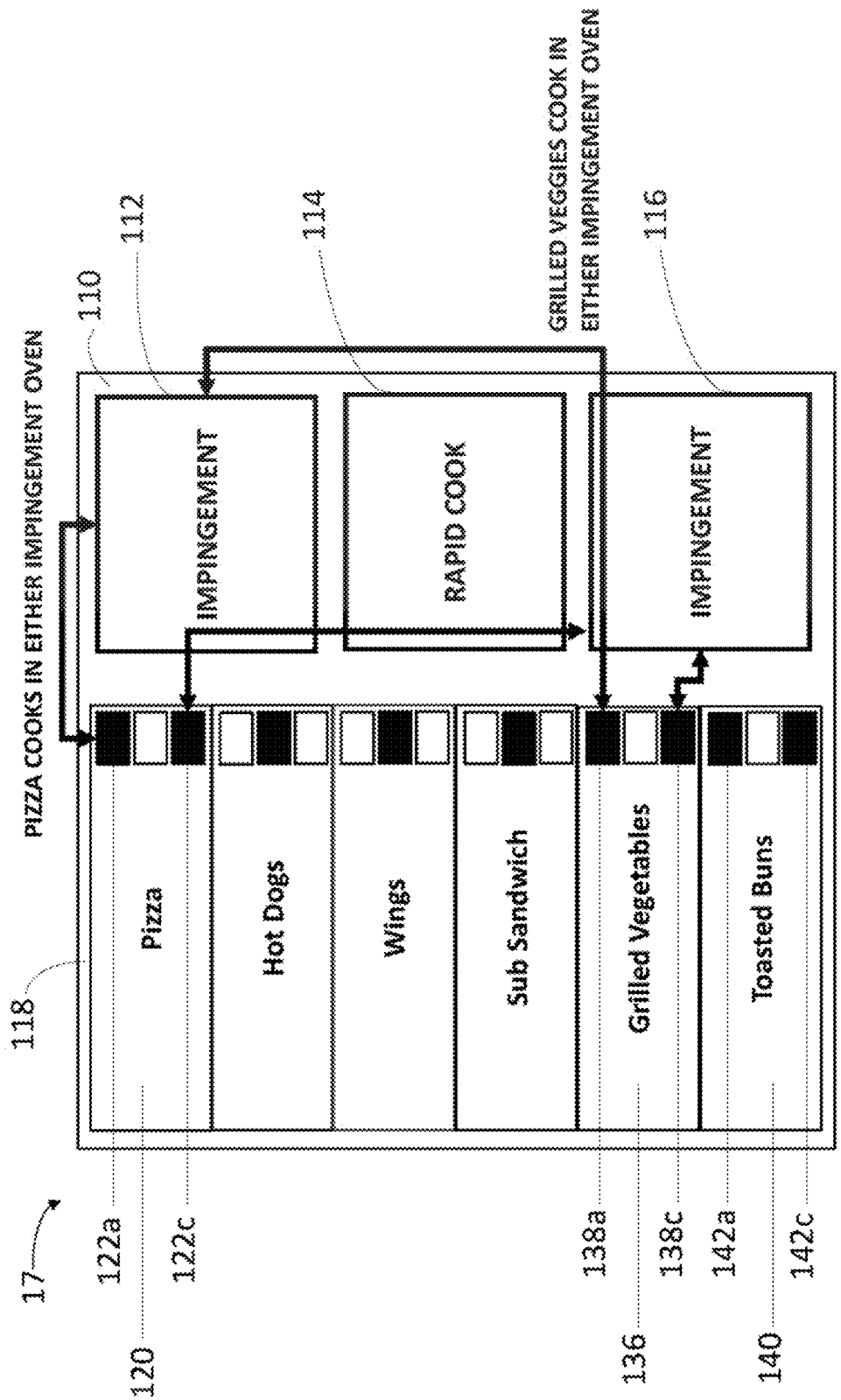
FIGS. 12A-12C show an example of a user interface displayed on a control panel of the modular cooking appliance, in accordance with another embodiment.

FIG. 12A illustrates an exemplary user interface displayed on display 17 for a configuration of modular cooking appliance 10 that includes two ovens of the same type. For example, modular cooking appliance 10 may include a rapid cook oven and two impingement ovens. In that case, the oven designators for any displayed food item for which the modular cooking appliance 10 has designated the two impingement ovens to cook the food item are blackened. As shown in FIG. 12A, the blackened oven designators 122a and 122c in subsection 120 ("Pizza") indicate to the operator that both of the impingement ovens have been designated to cook pizza. Likewise, the blackened oven designators 138a and 138c in subsection 136 ("Grilled Vegetables") and the blackened oven designators 142a and 142c in subsection 140 ("Toasted Buns") indicate to the operator of modular cooking appliance 10 that both of the impingement ovens are also designated to cook grilled vegetables and toasted buns.

In additional embodiments, when modular cooking appliance 10 includes more than one oven of the same type (such as two impingement ovens as depicted in FIG. 12A), and each of the ovens is available to cook a food item, the controller 70 will send the cook settings for the food items that are cooked by that type of oven to the oven that has been designated as the default oven. The designation of which one of multiple ovens of the same oven type within modular cooking appliance 10 is the default oven is based on the preferences of food-service operators. For example, if modular cooking appliance 10 includes two impingement ovens, as depicted in FIG. 12A, a food service operator may set up its modular cooking appliance 10 in accordance with a "top-down" approach. Under this approach, modular cooking appliance 10 is set up so that the top-most available oven of the same oven type in a configuration of modular cooking appliance 10 is designated as the default oven.

Figure 12B:
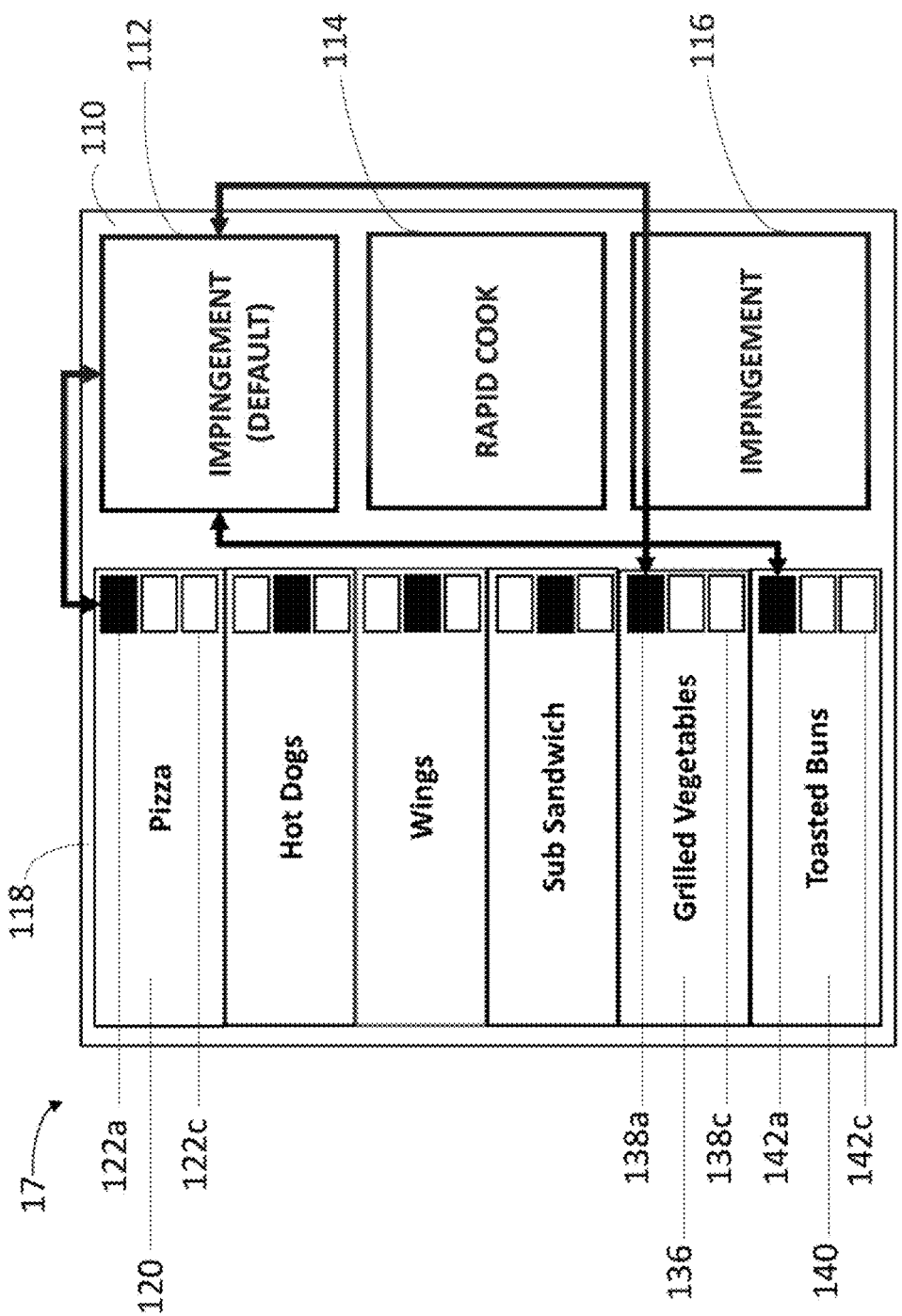

Referring to FIG. 12A, under a top-down approach, the impingement oven that is the top oven in the configuration of modular cooking appliance 10, which is depicted in subsection 112 of first section 110 of the user interface displayed on display 17, is the top-most oven and is thus initially designated as the default impingement oven. Since controller 70 will send the cook settings for a selected food item to the oven that has been designated as the default oven, the user interface displayed on display 17 will need to direct the operator to load the food item into the default oven. Accordingly, as depicted in FIG. 12B, under the top-down approach, only the oven designator 122a in subsection 120 ("Pizza") is blackened to indicate to the operator that the pizza should be loaded into the top impingement oven depicted in subsection 112 of first section 110. Likewise, only the oven designator 138a in subsection 136 ("Grilled Vegetables") is blackened and only the oven designator 142a in subsection 140 ("Toasted Buns") is blackened to indicate to the operator of modular cooking appliance 10 that the grilled vegetables and the toasted buns should be loaded into the top-most impingement oven depicted in subsection 112 of first section 110.

In FIGS. 11A, 11B, 12A, and 12B, the user interface displayed on display 17 corresponds to a situation where no food item is being cooked in the modular cooking appliance 10. Rather, each oven in the configurations of modular cooking appliance 10 represented in the user interface displayed on display 17 of FIGS. 11A, 11B, 12A, and 12B is idling at the designated set temperature for that oven.

Figure 12C:
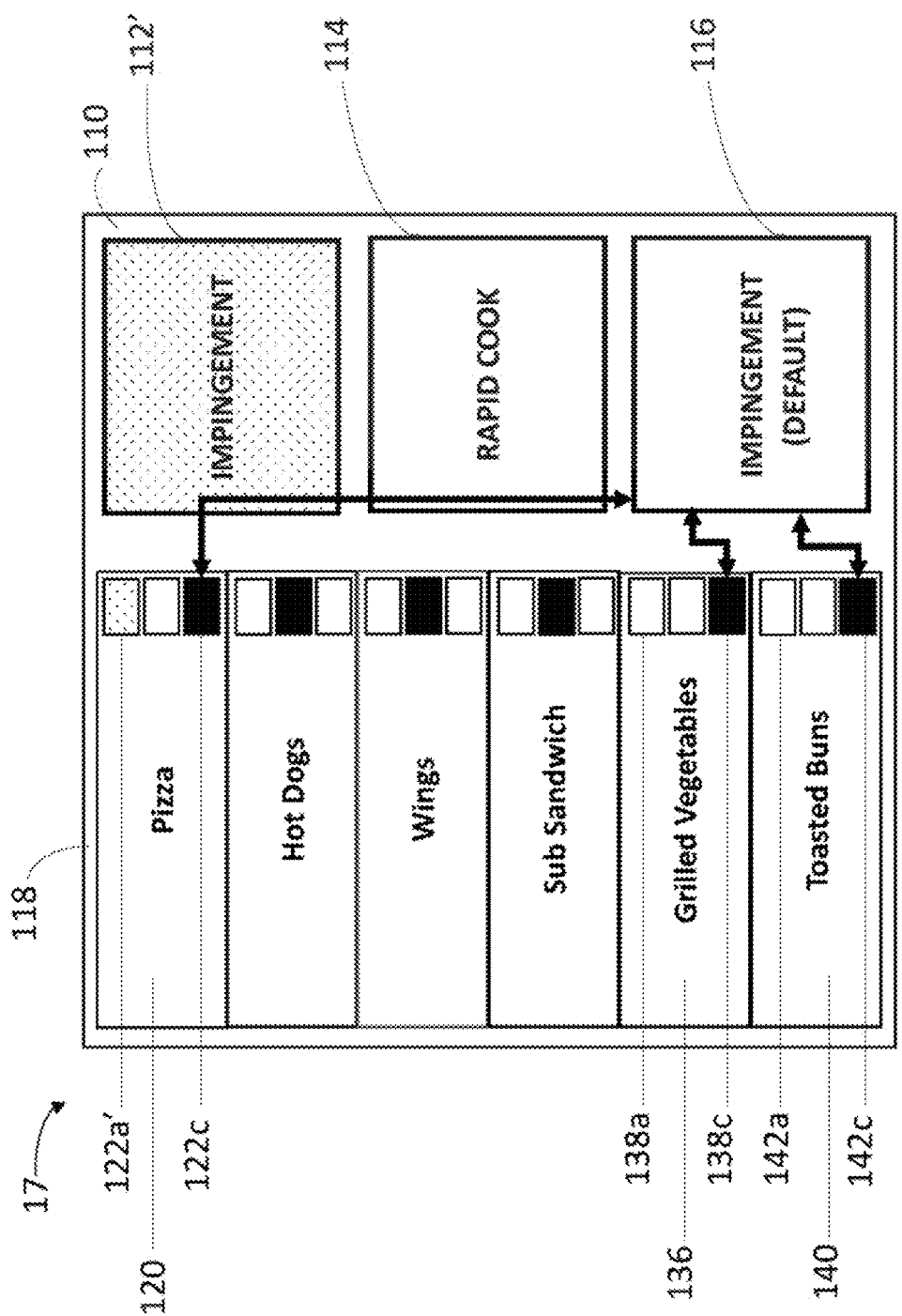

If the top-most oven in the configuration of modular cooking appliance 10 becomes unavailable because it is cooking a food item, the next top-most available oven of the same oven type becomes the default oven. Referring now to FIG. 12C, if the top impingement oven is busy cooking a pizza, for example, then the bottom impingement oven, which is depicted in subsection 116 of first section 110 of the user interface displayed on display 17, becomes the top-most available oven and thus is designated as the default impingement oven until the top impingement oven once again becomes available. Accordingly, under the top-down approach, the oven designator 122c in subsection 120 ("Pizza") is then blackened to indicate to the operator that the pizza should be loaded into the bottom impingement oven depicted in subsection 116 of first section 110. Likewise, only the oven designator 138c in subsection 136 ("Grilled Vegetables") is blackened and only the oven designator 142a in subsection 140 ("Toasted Buns") is blackened to indicate to the operator of modular cooking appliance 10 that the grilled vegetables and the toasted buns should be loaded into the bottom impingement oven depicted in subsection 116 of first section 110 until the top impingement oven, which is depicted in subsection 112' of first section 110, once again becomes available.

In additional embodiments, a food service operator may set up its modular cooking appliance 10 in accordance with a "bottom-up" approach. Under this approach, modular cooking appliance 10 is set up so that the bottom-most available oven of the same oven type in a configuration of modular cooking appliance 10 is designated as the default oven. One of ordinary skill in the art will readily understand which of the oven designators in subsections 120, 124, 128, 132, 136, 140 of second section 118 will be blackened in the user interface displayed on display 17 in a bottom-up approach in light of the description provided above regarding the top-down approach.

Figure 13:
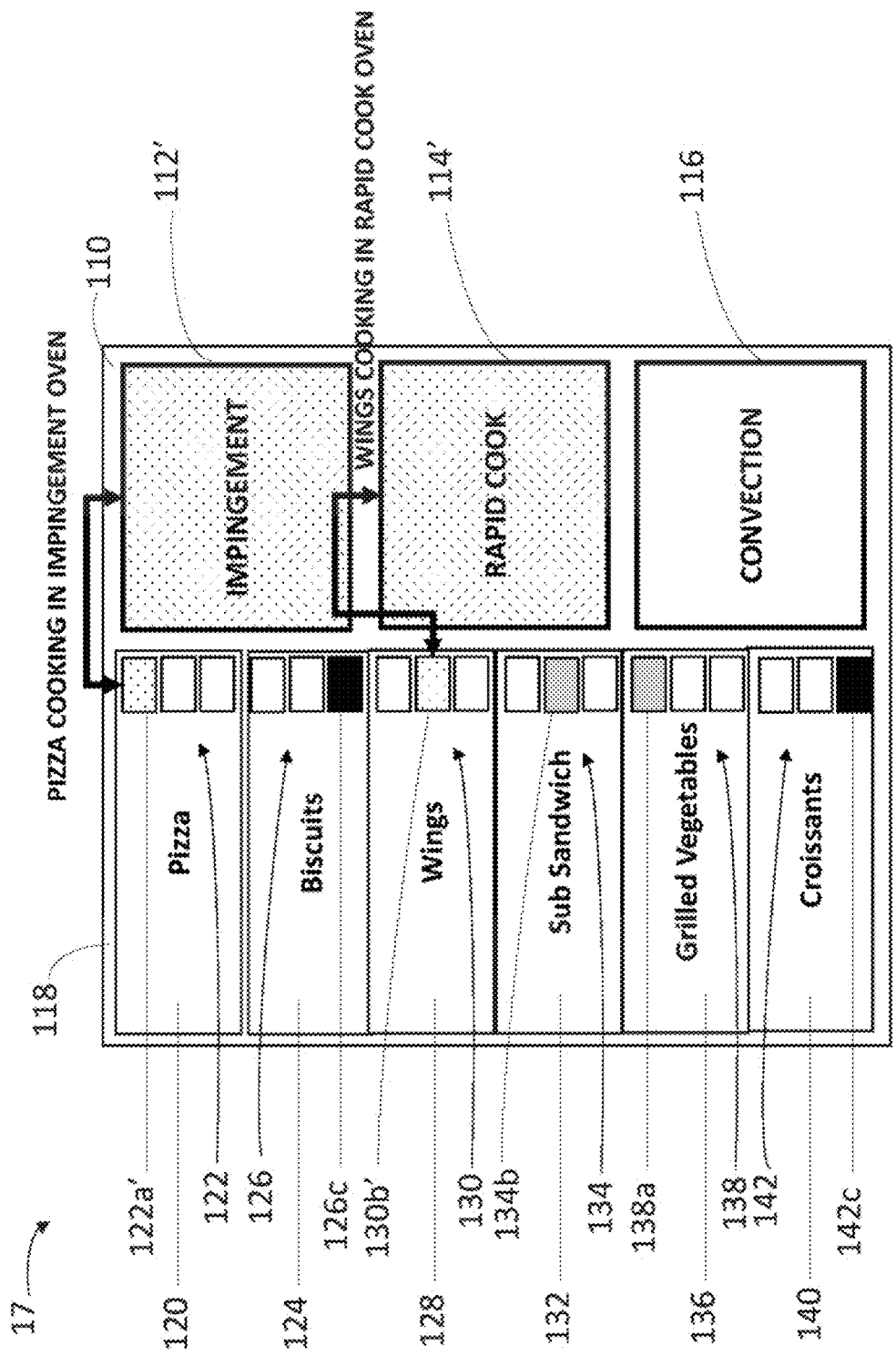
FIG. 13 shows an example of a user interface displayed on a control panel of the modular cooking appliance when two of its ovens are cooking food items, in accordance with one embodiment.

As indicated in subsection 112' of first section 110 and in oven designator 122a' of subsection 120 of second section 118 shown in FIG. 12C, when food is cooking in one or more ovens of modular cooking appliance 10, the user interface displayed on display 17 indicates that the one or more ovens is in operation and is not currently available to cook other food items that use that same oven. Referring now to FIG. 13, subsections 112' and 114' of the user interface displayed on display 17 are each depicted using a dotted pattern to indicate a change in color in subsections 112 and 114 of display 17 when the impingement oven and the rapid cook oven, respectively, are currently cooking food items and thus are not currently available to cook other food items that use those same ovens. In embodiments of modular cooking appliance 10, both subsections 112' and 114' are displayed using a green color to indicate that they are currently cooking food items and thus are not currently available to cook other food items. It will be understood by those of ordinary skill in the art that any color can be used for this purpose.

Likewise, oven designator 122a' in configuration diagram 122 of subsection 120 ("Pizza") is also depicted using the dotted pattern of subsection 112' to indicate that a pizza is being cooked in the impingement oven; and oven designator 130b' in configuration diagram 130 of subsection 128 ("Wings") is also depicted using the dotted pattern of subsection 114' to indicate that wings are being cooked in the rapid cook oven. In embodiments of modular cooking appliance 10, both oven designators 112' and 114' are displayed using the same color (e.g., green) that is used to indicate that an oven is currently cooking a food item and thus is not currently available to cook other food items for which that oven is designated by modular cooking appliance 10. It will be understood by those of ordinary skill in the art that any color can be used for this purpose.

Referring still to FIG. 13, the user interface displayed on display 17 also indicates to an operator of modular cooking appliance that the impingement oven and the rapid cook oven are not currently available to cook certain other food items that use those same ovens. As shown in FIG. 13, oven designator 134b in configuration diagram 134 of subsection 132 ("Sub Sandwich") is displayed with a grey color to indicate to the operator that the rapid cook oven (i.e., the middle oven in the current configuration of modular cooking appliance 10) is currently unavailable to cook a sub sandwich. Similarly, oven designator 138a in configuration diagram 138 of subsection 136 ("Grilled Vegetables") is also displayed with a grey color to indicate to the operator that the impingement oven (i.e., the top oven in the current configuration of modular cooking appliance 10) is currently unavailable to cook grilled vegetables. (It will be understood by those of ordinary skill in the art that other colors besides grey can be used for this purpose.) Since the convection oven is not in use, oven designator 126c in configuration diagram 126 of subsection 124 ("Biscuits") and oven designator 142c in configuration diagram 142 of subsection 140 ("Croissants") remain black to indicate to an operator that those food items are available to be cooked in the convection oven. (Here again, it will be understood by those of ordinary skill in the art that other colors besides black can be used for this purpose.)

In accordance with additional exemplary embodiments of the present invention, the FET (see FIG. 8A) of modular cooking appliance 10 can include cook settings for a specific food item for two different oven types. For example, a 16-inch pizza (e.g., a pepperoni pizza) may cook in an impingement oven in three and a half minutes and modular cooking appliance 10 may designate the impingement oven as the primary oven type for cooking the pepperoni pizza. However, that same 16-inch pepperoni pizza may also cook to substantially the same finish standard in a convection oven in six minutes under a separately developed, secondary cook setting that can be used when the impingement oven is in use cooking a food item but the convection oven is available. (In this regard, it should be noted that many, if not most, food items will only be cooked in one type of oven and, as such, will only have one cook setting entered in the FET. An example of this might be frozen croissants, which cook well in a convection oven but may not cook to the same finished quality standards in an impingement oven or in a rapid cook oven.)

In accordance with additional exemplary embodiments of the present invention, the user interface displayed on display 17 of modular cooking appliance 10 indicates to an operator that—for certain food items—even though their primary oven is in use, the food item can be cooked in a secondary oven type for which a separate cook setting has been entered and stored in the FET. Specifically, if (and only if) (a) the FET of modular cooking appliance 10 includes a cook setting for a food item in both a primary oven type and a secondary oven type; (b) the primary oven type for the food item is in use, and (c) the secondary oven type is currently available; then the configuration diagram within the subsection of second section 118 of the user interface displayed on display 17 for that menu item indicates to the operator that the secondary oven is available.

Figure 14A:
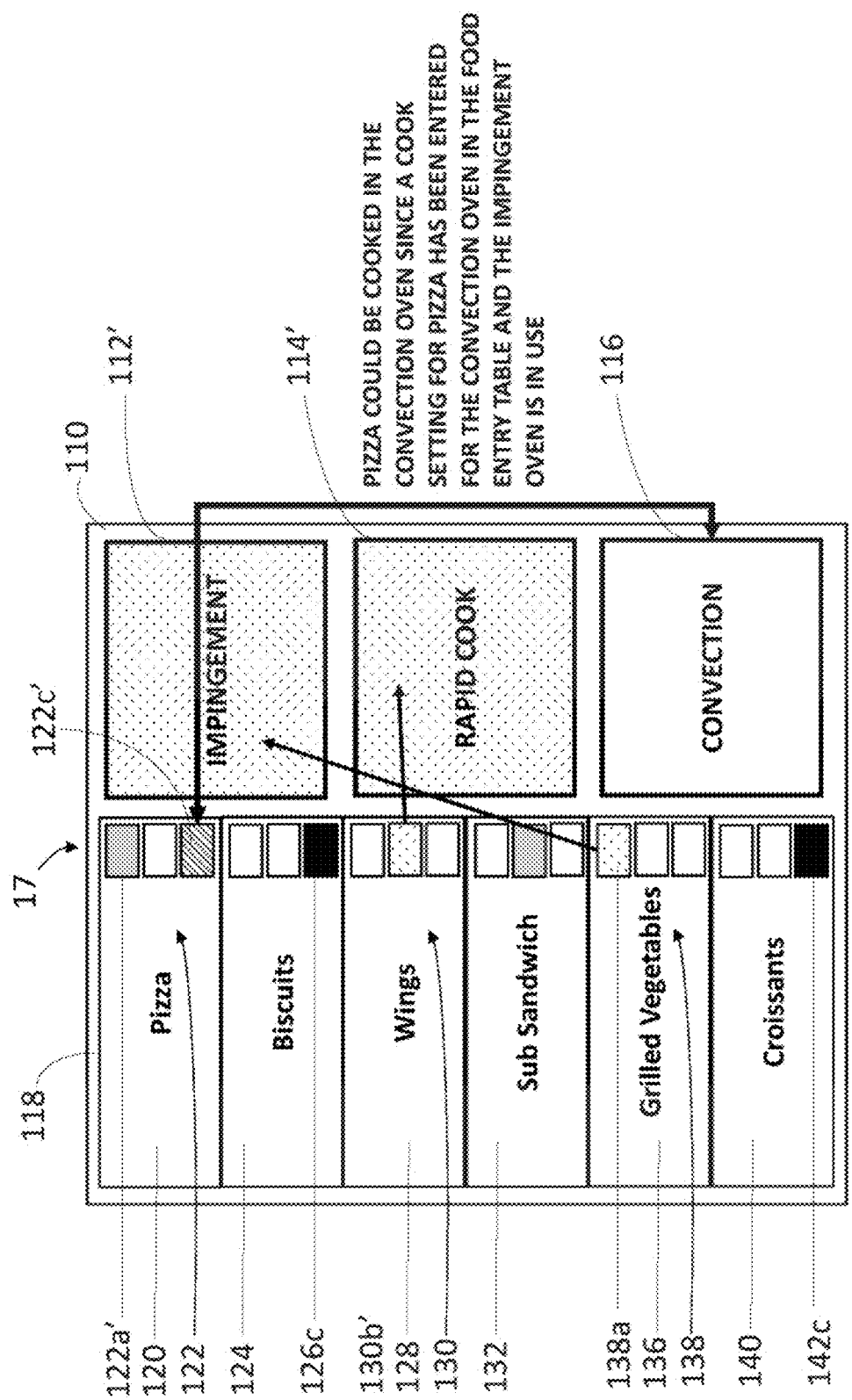
FIGS. 14A and 14B show an example of a user interface displayed on a control panel of the modular cooking appliance when two of its ovens are cooking food items and a cook setting for a secondary oven type is available for one of the food items, in accordance with one embodiment.

As shown in FIG. 14A, subsections 110, 114' and oven designators 130b', 138a of the user interface displayed on display 17 indicate that the impingement oven (i.e., the top oven in the current configuration of modular cooking appliance 10) is currently busy cooking grilled vegetables and that the rapid cook oven (i.e., the middle oven in the current configuration of modular cooking appliance 10) is currently busy cooking wings. Subsection 116 (which is not depicted using a dotted pattern, thus indicating no change in its color) and oven designators 126c and 142c (which are both blackened) indicate that the convection oven (i.e., the bottom oven in the current configuration of modular cooking appliance 10) is not currently cooking any food item. As discussed above with regard to FIG. 13, the color of oven designator 122a' in configuration diagram 122 of subsection 120 ("Pizza") is changed from black to grey to indicate that the impingement oven is unavailable because it is currently cooking grilled vegetables.

In addition, oven designator 122c' in configuration diagram 122 of subsection 120 ("Pizza") is depicted using a cross-hatch pattern to indicate a change in color in oven designator 122c of the user interface displayed on display 17 when the pizza can be cooked in the convection oven. This change in color alerts the operator of modular cooking appliance 10 that a separate cook setting for cooking pizza in a convection oven has been entered and stored in the FET and that the pizza can be cooked in the convection oven. In embodiments, oven designator 122c' is displayed using a yellow color. It will be understood by those of ordinary skill in the art that any color can be used for this purpose.

Figure 14B:
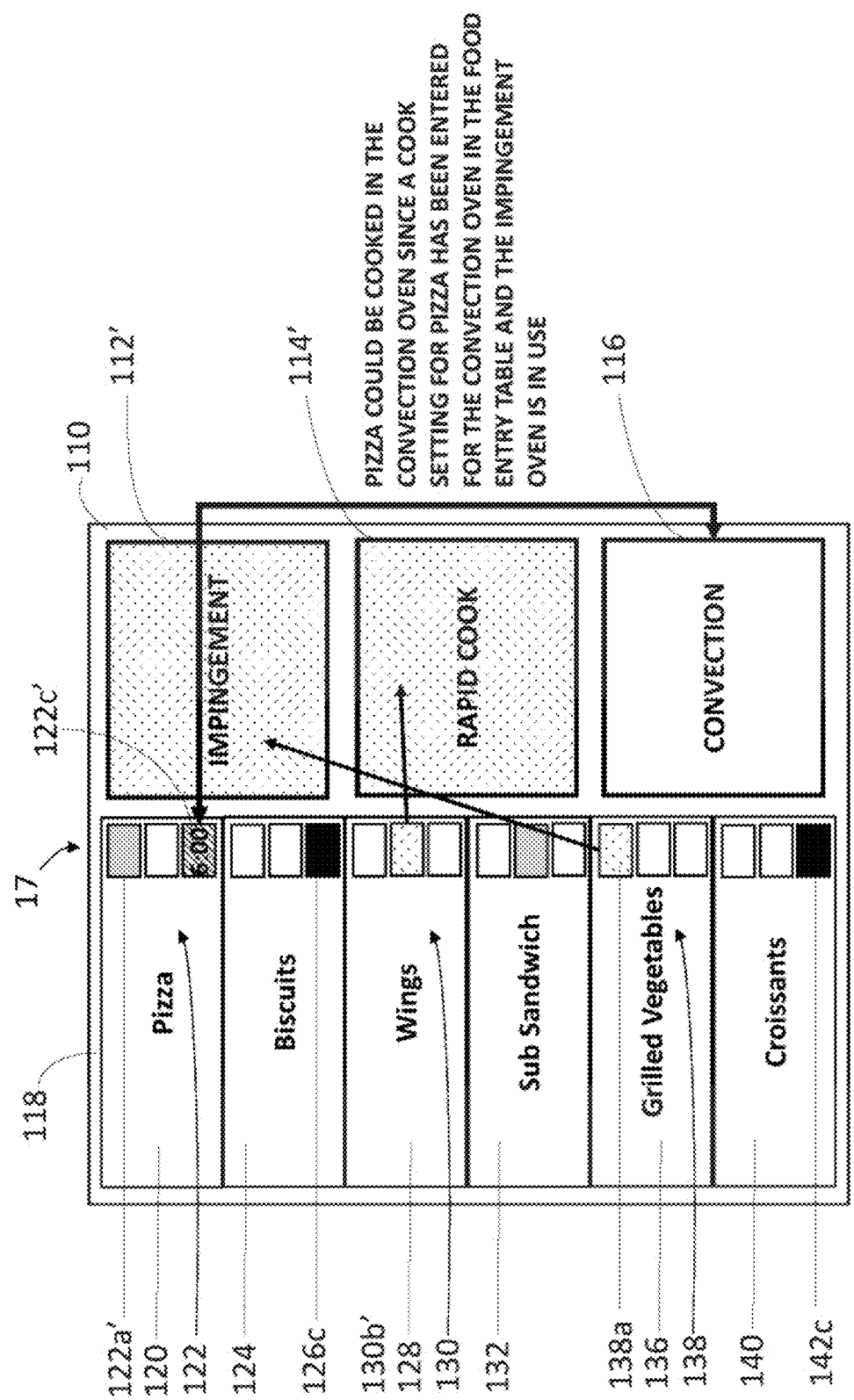

In currently preferred embodiments, the time it would take to finish the food item in the secondary oven is preferably shown to the operator so that the operator can decide whether to cook the food item in the secondary oven or to wait until a primary oven is available. For example, as shown in FIG. 14B, the time it would take to cook the pizza in the convection oven (i.e., six minutes) can be displayed within oven designator 122c' in configuration diagram 122 of subsection 120 ("Pizza"). The operator can then decide whether to cook the pizza in the convection oven or to wait until the impingement oven becomes available. (In this regard, in embodiments, modular cooking appliance 10 is configured to display the time remaining to cook food items in each of its ovens in subsections 112, 114, 116 of the first section 110 of the user interface displayed on display 17.)

In accordance with the additional exemplary embodiments described herein, the user interface displayed on display 17 of modular cooking appliance 10 minimizes the number of steps that an operator needs to take to begin cooking a particular food item. The user interface displayed on display 17 directs the operator to the oven in modular cooking appliance 10 that should be used to cook the particular food item. Thus, the user interface displayed on display 17 enables the operator of modular cooking appliance 10 to know quickly and easily, in each configuration of modular cooking appliance 10, which oven should be used to cook the particular food item. The operator then simply loads the food item into that oven, for example by placing the food item onto a food loading platform of a food loading mechanism for the oven. Examples of food loading platforms and mechanisms are shown and described herein with regard to FIGS. 2A-2C and 6B-6D. After doing so, the operator needs only to touch the subsection of the second section 118 of the user interface displayed on display 17 that corresponds to the particular food item to load the food item into the oven and to begin cooking it.

V. Uniform Operating Steps for Operators

The operating procedure is the same for all the ovens within modular cooking appliance 10.

For the present embodiment, modular cooking appliance 10 enters operating mode upon completion of oven startup, during which each of impingement oven 20, convection oven 40 and microwave oven 60 warm up to their preset operating temperatures. Once in operating mode, a listing of the various food items for which operating parameters have been entered via control panel 17 is displayed on control panel 17. An operator can select the food item to be cooked from among the items displayed on control panel 17 and places the food on a food loading mechanism of the corresponding oven. The food is then transported into the heated oven cavities for cooking.

After the cook process has been completed, the cooked food is transported from the oven cavities back to where the food entered the associated oven. The food loading mechanisms are not themselves heated, effectively concluding the cook process once the food exits the heated oven cavities. However, because the food loading mechanisms are adjacent to the heated oven cavities contained in interchangeable cooking modules 12a-12c, residual heat from the heated oven cavities contained in interchangeable cooking modules 12a-12c serves to reduce the rate of heat loss experienced by the recently cooked food.

Food items may be concurrently cooked in impingement oven 20, convection oven 40 and microwave oven 60 of modular cooking appliance 10. Similar food items may be consecutively cooked in impingement oven 20, convection oven 40 and microwave oven 60 of modular cooking appliance 10. For example, pizzas may be cooked back to back to back in impingement oven 20 while cinnamon rolls are being cooked back to back to back in convection oven 40 while breakfast sandwiches are being cooked back to back to back in microwave oven 60. In order for the amount of heat energy delivered to the similar food items cooked consecutively in the various ovens to be the same in each of the back to back to back cooks when modular cooking appliance 10 is powered by an electric circuit of no more wattage than a typical single-phase 50-Amp outlet, the volumes of the cook cavities of the ovens held within interchangeable cooking modules 12a-12c are no larger than 1.5 cubic feet for the convection oven, 1.25 cubic feet for the impingement oven and 1 cubic feet for the microwave oven.

As has been described, the present invention provides a modular cooking appliance having multiple ovens.

While the invention has been particularly shown and described with reference to preferred embodiments, it will be understood by those skilled in the art that various changes in form and detail may be made therein without departing from the spirit and scope of the invention.

What is claimed is:

1. A modular cooking apparatus, comprising:
   a housing having a first interchangeable cooking module, a second interchangeable cooking module, and a single power connection for receiving electrical power from a wall outlet;
   a first oven contained within said first interchangeable cooking module;
   a second oven contained within said second interchangeable cooking module, wherein said second oven is a different oven type from said first oven;

a controller within said housing for controlling said first oven and said second oven, said controller including a memory, the memory stores:
- a food entry table containing a list of food items to be cooked within said modular cooking apparatus and a corresponding oven type for each of said food items; and
- a current drawn history table which includes a plurality of time units and which contains currents drawn by said first oven in said plurality of time units when said first oven is cooking one of said food items listed in said food entry table and currents drawn by said second oven in said plurality of time units when said second oven is cooking one of said food items listed in said food entry table;

said controller is configured to control oven temperatures of said first oven and said second oven using said currents contained in said plurality of time units of said current drawn history table; and a control panel on said housing, wherein said control panel displays a user interface that directs an operator of said modular cooking apparatus to the one of said first oven and said second oven that should be used to cook a particular one of said food items.

2. The modular cooking apparatus of claim 1, wherein:

said control panel displays said oven type of said first oven in a first subsection of a first section of said user interface and displays said oven type of said second oven in a second subsection of said first section, said first subsection and said second subsection of said first section being arranged in a manner that corresponds to the relative positions of said first oven and said second oven in said housing; and said control panel also displays, in a second section of said user interface, said food items for which said first oven or said second oven is a corresponding oven type.

3. The modular cooking apparatus of claim 2, wherein each of said food items for which said first oven or said second oven is a corresponding oven type is displayed in a separate subsection of said second section of said user interface.

4. The modular cooking apparatus of claim 3, wherein each of said food items is displayed using a text description of said food item.

5. The modular cooking apparatus of claim 3, wherein each of said food items is displayed using an image of said food item.

6. The modular cooking apparatus of claim 3, wherein each of said food items is displayed using an icon representing said food item.

7. The modular cooking apparatus of claim 3, wherein each subsection of said second section of said user interface further includes a first oven designator representative of said first oven and a second oven designator representative of said second oven, said first oven designator and said second oven designator arranged within said subsection in a manner that corresponds to the relative positions of said first oven and said second oven in the housing.

8. The modular cooking apparatus of claim 7, wherein said first oven designator and said second oven designator indicate which one of said first oven and said second oven has been designated to cook said food item identified within said subsection.

9. The modular cooking apparatus of claim 8, wherein:

said memory stores a primary oven type and a secondary oven type for at least one food item in said list of food items to be cooked within said modular cooking apparatus; and said first oven designator and said second oven designator indicate whether one of said first oven and said second oven is available to cook said food item identified within said subsection as a secondary oven type for said food item.

10. A modular cooking apparatus, comprising:
- a housing having a first interchangeable cooking module, a second interchangeable cooking module, a third interchangeable cooking module, and a single power connection for receiving electrical power from a wall outlet;
- a first oven contained within said first interchangeable cooking module;
- a second oven contained within said second interchangeable cooking module;
- a third oven contained within said third interchangeable cooking module, wherein said third oven is a different oven type from said first oven and said second oven;
- a controller within said housing for controlling said first oven, said second oven, and said third oven, said controller including a memory, the memory stores:
  - a food entry table containing a list of food items to be cooked within said modular cooking apparatus and a corresponding oven type for each of said food items; and
  - a current drawn history table which includes a plurality of time units and which contains currents drawn by said first oven in said plurality of time units when said first oven is cooking one of said food items listed in said food entry table, currents drawn by said second oven in said plurality of time units when said second oven is cooking one of said food items listed in said food sentry table, and currents drawn by said third oven in said plurality of time units when said third oven is cooking one of said food items listed in said food entry table;

said controller is configured to control oven temperatures of said first oven, said second oven, and said third oven using said currents contained in said plurality of time units of said current drawn history table; and a control panel on said housing, wherein said control panel displays a user interface that directs an operator of said modular cooking apparatus to the one of said first oven, said second oven, and said third oven that should be used to cook a particular one of said food items.

11. The modular cooking apparatus of claim 10, wherein:

said control panel displays said oven type of said first oven in a first subsection of a first section of said user interface, said oven type of said second oven in a second subsection of said first section, and said oven type of said third oven in a third subsection of said first section, said first subsection, said second subsection, and said third subsection of said first section being arranged in a manner that corresponds to the relative positions of said first oven, said second oven, and said third oven in the housing; and said control panel also displays, in a second section of said user interface, said food items for which said first oven, said second oven, or said third oven is a corresponding oven type.

12. The modular cooking apparatus of claim 11, wherein each of said food items for which said first oven, said second oven, or said third oven is a corresponding oven type is displayed in a separate subsection of said second section of said user interface.

13. The modular cooking apparatus of claim 12, wherein each of said food items is displayed using a text description of said food item.

14. The modular cooking apparatus of claim 12, wherein each of said food items is displayed using an image of said food item.

15. The modular cooking apparatus of claim 12, wherein each of said food items is displayed using an icon representing said food item.

16. The modular cooking apparatus of claim 12, wherein each subsection of said second section of said user interface further includes a first oven designator representative of said first oven, a second oven designator representative of said second oven, and a third oven designator representative of said third oven, said first oven designator, said second oven designator, and said third oven designator arranged within said subsection in a manner that corresponds to the relative positions of said first oven, said second oven, and said third oven in said housing.

17. The modular cooking apparatus of claim 16, wherein said first oven designator, said second oven designator, and said third oven designator indicate which one of said first oven, said second oven, and said third oven has been designated to cook said food item identified within said subsection.

18. The modular cooking apparatus of claim 17, wherein:
said memory stores a primary oven type and a secondary oven type for at least one food item in said list of food items to be cooked within said modular cooking apparatus; and
said first oven designator, said second oven designator, and said third oven designator indicate whether one of said first oven, said second oven, and said third oven is available to cook said food item identified within said subsection as a secondary oven type for said food item.

19. The modular cooking apparatus of claim 17, wherein said second oven is the same oven type as said first oven.

20. The modular cooking apparatus of claim 19, wherein, in each subsection of said second section of said user interface that displays one of said food items for which said same oven type of said first oven and said second oven is a corresponding oven type, said first oven designator representative of said first oven and said second oven designator representative of said second oven indicate that said first oven and said second oven have been designated to cook said food item identified within said subsection.

21. The modular cooking apparatus of claim 19, wherein one of said first oven and said second oven is designated as a default oven.

22. The modular cooking apparatus of claim 21, wherein, in each subsection of said second section of said user interface that displays one of said food items for which said same oven type of said first oven and said second oven is a corresponding oven type, said oven designator representative of said default oven indicates that said default oven has been designated to cook said food item identified within said subsection.

23. The modular cooking apparatus of claim 22, wherein a top-most one of said first oven and said second oven in said housing that is available to cook one of said food items for which said same oven type of said first oven and said second oven is a corresponding oven type is designated as said default oven.

24. The modular cooking apparatus of claim 22, wherein a bottom-most one of said first oven and said second oven in said housing that is available to cook one of said food items for which said same oven type of said first oven and said second oven is a corresponding oven type is designated as said default oven.

25. A modular cooking apparatus, comprising:
a housing having a first interchangeable cooking module, a second interchangeable cooking module, and a single power connection for receiving electrical power from a wall outlet;
a first oven contained within said first interchangeable cooking module;
a second oven contained within said second interchangeable cooking module, wherein said second oven is a different oven type from said first oven;
a controller within said housing for controlling said first oven and said second oven, said controller including a memory, the memory stores:
a food entry table containing a list of food items to be cooked within said modular cooking apparatus and a corresponding oven type for each of said food items; and
a current drawn history table which includes a plurality of time units and which contains currents drawn by said first oven in said plurality of time units when said first oven is cooking one of said food items listed in said food entry table and currents drawn by said second oven in said plurality of time units when said second oven is cooking one of said food items listed in said food entry table;
said controller is configured to control oven temperatures of said first oven and said second oven using said currents contained in said plurality of time units of said current drawn history table; and
a control panel on said housing, wherein:
said control panel displays a user interface and displays, in a section of said user interface, said food items for which said first oven or said second oven is a corresponding oven type; and
both selection of a displayed food item for cooking and initiation of the cooking of said displayed food item are initiated in a single step by touching a portion of said user interface that corresponds to said displayed food item.

26. The modular cooking apparatus of claim 25, wherein said portion of said user interface that corresponds to said displayed food item includes a configuration diagram of said first oven and said second oven that directs an operator of said modular cooking apparatus to the one of said first oven and said second oven that should be used to cook said displayed food item.

27. A method of using the modular cooking apparatus of claim 26, wherein said operator touches said portion of said user interface that corresponds to said displayed food item after said operator loads said displayed food item into the one of said first oven and said second oven that should be used to cook said displayed food item.

* * * * *